United States Patent [19]

Hsu et al.

[11] Patent Number: 4,809,236
[45] Date of Patent: Feb. 28, 1989

[54] METHOD AND APPARATUS FOR DETERMINING THE MAGNITUDE OF COMPONENTS OF MEASUREMENTS MADE FROM INSIDE A BOREHOLE

[75] Inventors: Kai Hsu, Danbury; Ralphe Wiggins, Ridgefield, both of Conn.

[73] Assignee: Schlumberger Technology Corporation, Ridgefield, Conn.

[21] Appl. No.: 919,091

[22] Filed: Oct. 15, 1986

[51] Int. Cl.[4] ................................................ G01V 1/40
[52] U.S. Cl. ........................................ 367/28; 367/27
[58] Field of Search ...................... 367/25, 28, 29, 33, 367/27, 34; 364/422

[56] References Cited

U.S. PATENT DOCUMENTS

| | | | |
|---|---|---|---|
| 4,346,460 | 1/1982 | Schuster | 367/27 |
| 4,543,648 | 9/1985 | Hsu | 367/29 |
| 4,554,647 | 11/1985 | Rafipour | 367/48 |
| 4,554,649 | 11/1985 | Herkenhoff | 367/68 |

OTHER PUBLICATIONS

"Residual Statics Analysis as a General Linear Inverse Problem," Wiggins et al., *Geophysics*, vol. 41, #5, 10/76.
"Formalized Inversion of Full Waveform Acoustic Log Traveltimes for Velocity," Willis et al., SEG 1983.
"Inversion of Travel Time for Velocity," Willis, M. E., SEG, 1983.
"Inversion of Travel Time for Velocity Using Multispacing Sonic tools," Paternoster, B. J., M.I.T. Earth Sciences Lab.
"On Some Further Aspects of Far Filtering," *Expanded Abstracts with Biographies*, 55th Int. SEQ Meeting, 10/6–10/85.
"Band-Limiting Interpolation Operators and Applications in Seismic Processing," *Expanded Abstracts with Biographies*, SEG mtg, 1984.
"Analysis of Sonic Log Compressional Wave Amplitudes, Using Borehole Compensation Techniques," 1984, SPWLA 25th Annular Log. Symp.
"Full Waveform Sonic Logging Techniques," Siegfried et al., SPWLA 23th Annular Logging Symposium, 1982.
"Optimum Inverse Filters Which Shorten the Spacing of Velocity Logs," M. R. Foster et al., *Geophysics*, vol. 27(3).

Primary Examiner—Thomas H. Tarcza
Assistant Examiner—Ian J. Lobo
Attorney, Agent, or Firm—Clifford L. Tager; Louis H. Reens

[57] ABSTRACT

Techniques are described whereby measurements derived from acoustic investigations made from inside a borehole penetraing an earth formation are factorized into components with high depth resolution. In one embodiment travel times of an acoustic wave such as the compressional is factored into mud travel time and interval travel times through the earth formation. In another embodiment amplitude measurements of an acoustic wave are factored into components such as receiver gain, earth formation attenuation, and coupling effectiveness at the boundary between the borehole and the earth formation. In both embodiments an additional component can be factored out that is a function of transmitter to receiver spacings. A modified Gauss-Seidel iteration technique is described whereby iterations can rapidly converge with less sensitivity to large variations in the measurements. Factorization of receiver gains effectively enables calibration of the receivers during well logging.

29 Claims, 24 Drawing Sheets

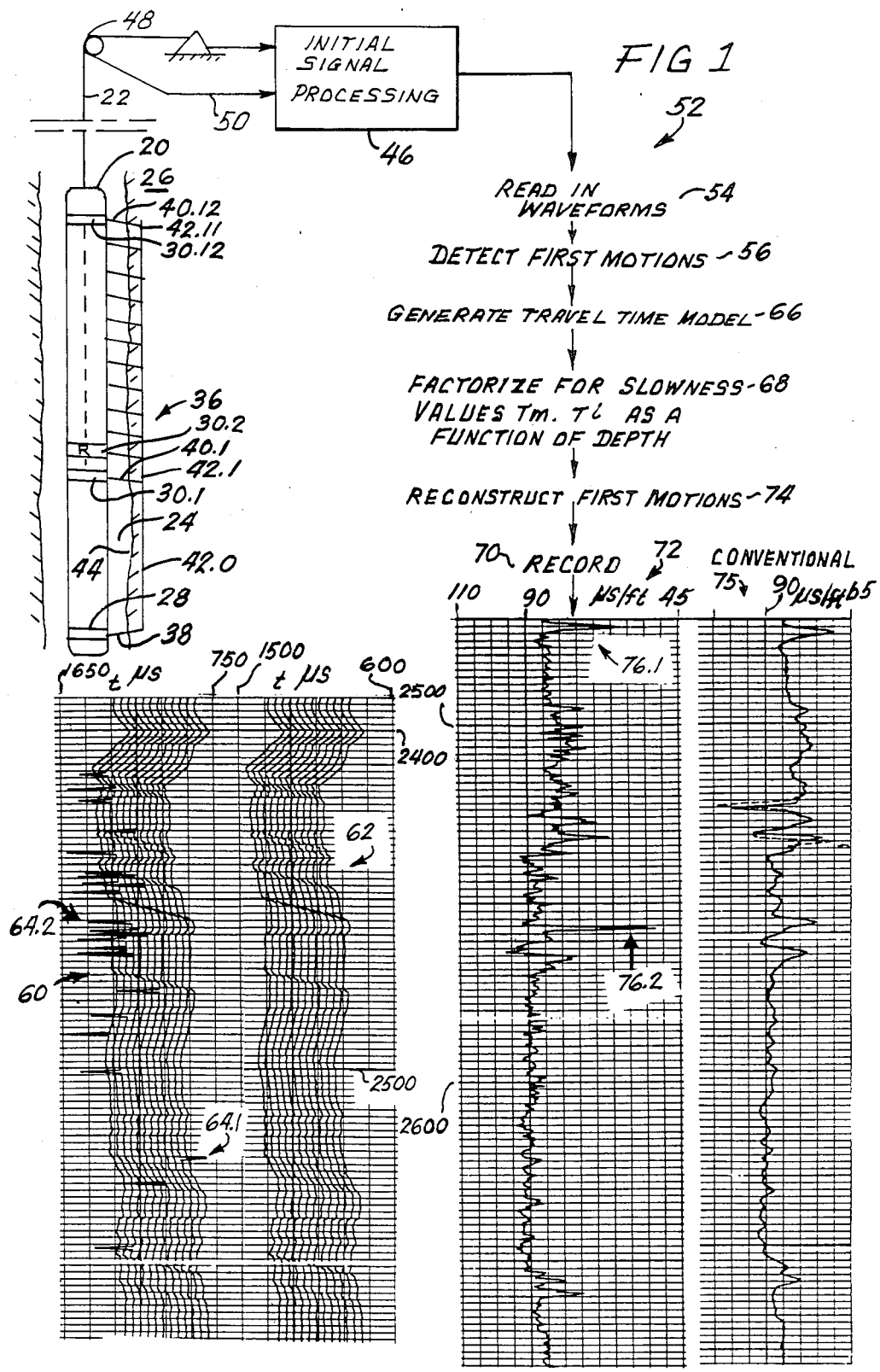

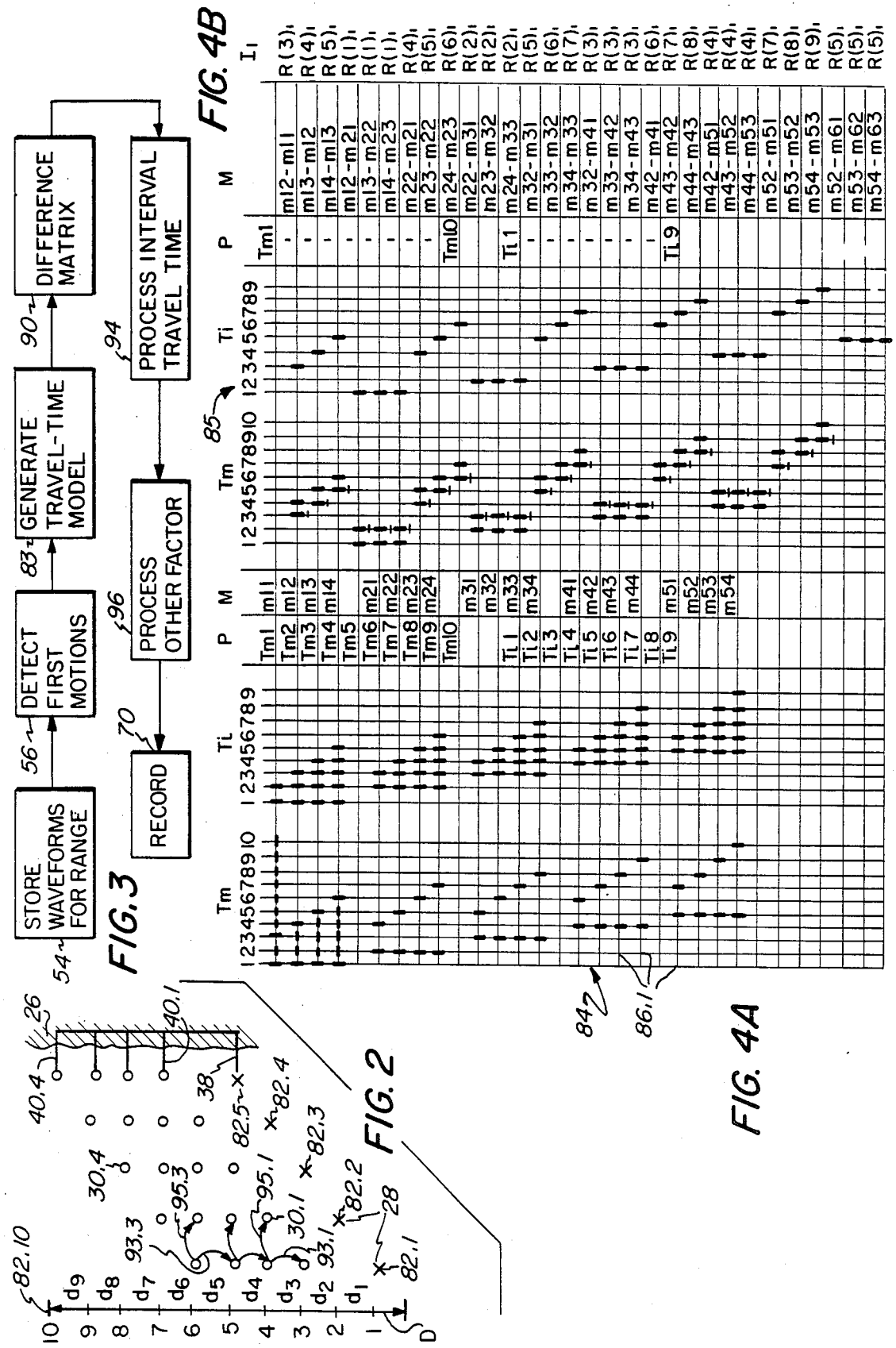

$m11 = Tm1 + Tm3 + Ti1 + Ti2$ $m12 = Tm1 + Tm4 + Ti1 + Ti2 + Ti3$ $m13 = Tm1 + Tm5 + Ti1 + Ti2 + Ti3 + Ti4$ $m14 = Tm1 + Tm6 + Ti1 + Ti2 + Ti3 + Ti4 + Ti5$ $\vdots$ $m54 = Tm5 + Tm10 + Ti5 + Ti6 + Ti7 + Ti8 + Ti9$

*FIG. 5*

| | |
|---|---|
| $m12 - m11 = Tm4 - Tm3 + Ti3$ | $m12 - m21 = Tm1 - Tm2 + Ti1$ |
| $m13 - m12 = Tm5 - Tm4 + Ti4$ | $m13 - m22 = Tm1 - Tm2 + Ti1$ |
| $m14 - m13 = Tm6 - Tm5 + Ti5$ | $m14 - m23 = Tm1 - Tm2 + Ti1$ |
| $m22 - m21 = Tm5 - Tm4 + Ti4$ | $m22 - m31 = Tm2 - Tm3 + Ti2$ |
| $m23 - m22 = Tm6 - Tm5 + Ti5$ | $m23 - m32 = Tm2 - Tm3 + Ti2$ |
| $m24 - m23 = Tm7 - Tm6 + Ti6$ | $m24 - m33 = Tm2 - Tm3 + Ti2$ |
| $\vdots$ | $\vdots$ |
| $m54 - m53 = Tm10 - Tm9 + Ti9$ | $m44 - m53 = Tm4 - Tm3 + Ti4$ |

*FIG. 6*

$$\overline{Ti}(5) = \frac{m23 + m24 + m32 + m33 + m34 + m41 + m42 + m43 + m44 + m51 + m52 + m53}{12} \quad \text{118}$$

*FIG. 7*

$$\overline{Ti}(5) = \frac{m23 - m22 + m32 - m31 + m52 - m61 + m53 - m62}{4} \quad \text{116}$$

*FIG. 8*

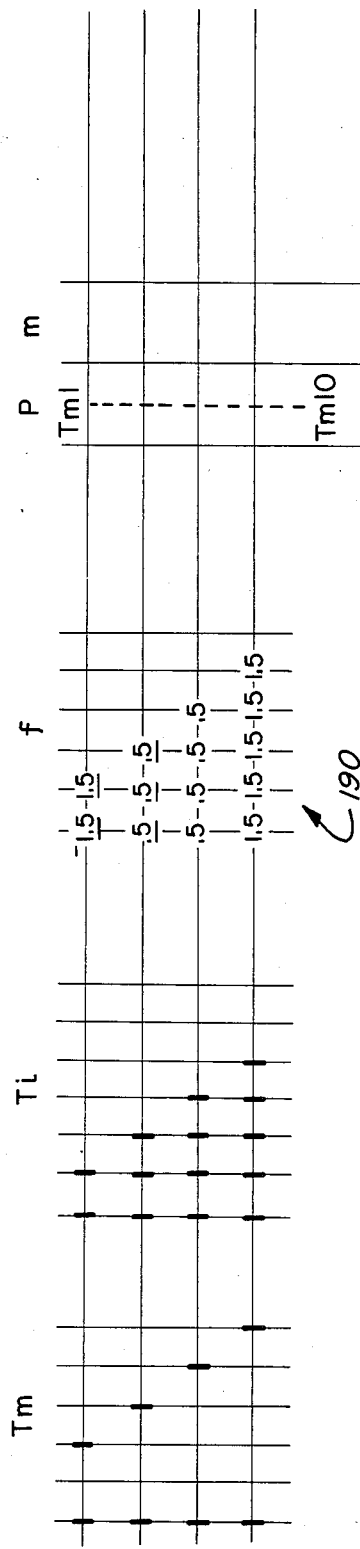
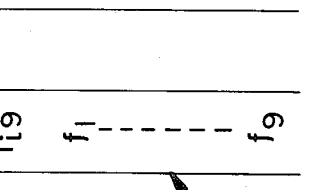
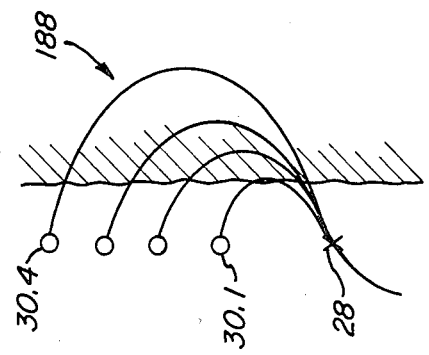
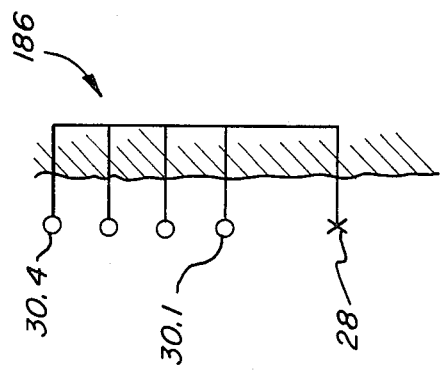
FIG. 12C
FIG. 12B
FIG. 12A

RAW

322  FIG.19

ALIGNMENT OF RAW P WAVES WITH SLANT

328  FIG.20

SLANT WITH DOWNGOING, BUT UPGOING REJECTED

334 FIG.21

REVERSE SLANT WITH DOWNGOING INTERFERENCE

FIG. 23  ↑350

FINAL ALIGNMENT

FIG. 24    $t_{354}$

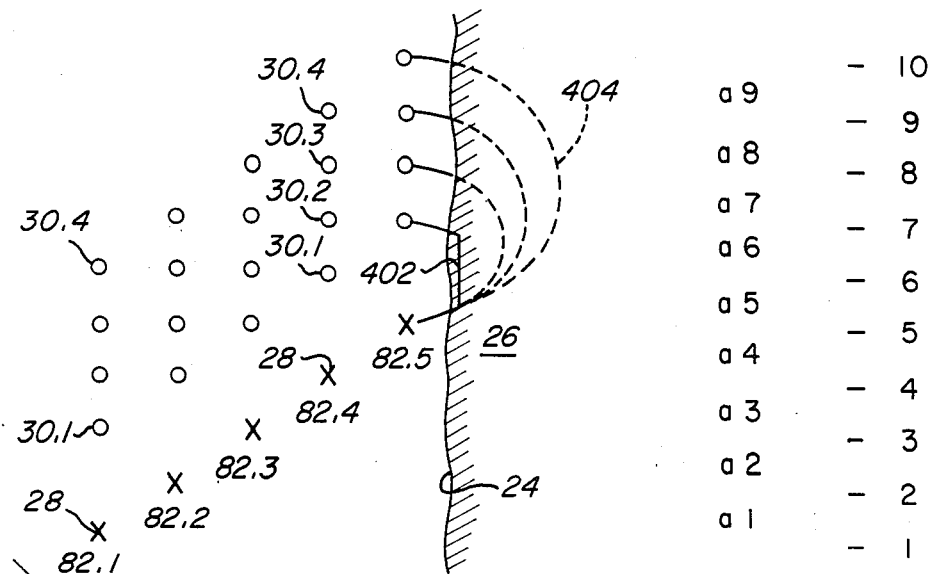
FIG. 27
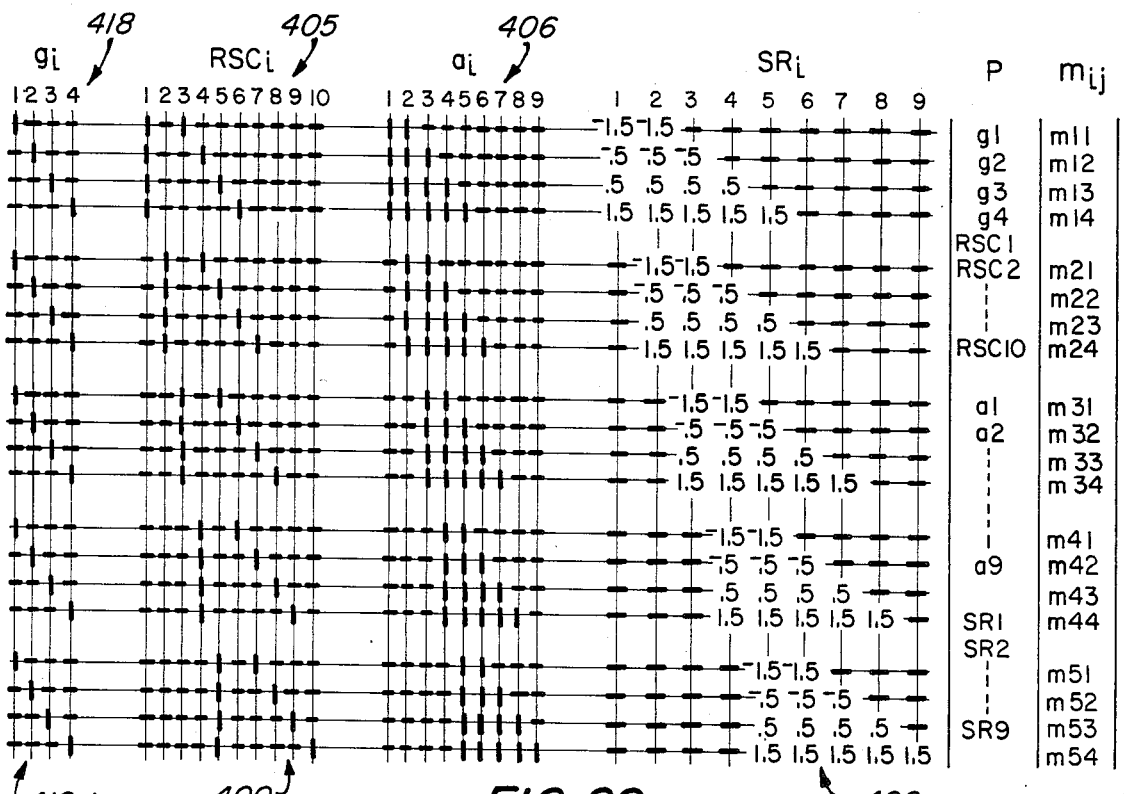
FIG. 28
$m11 = g1 + RSC1 + RSC3 + a1 + a2 - 1.5 SR1 - 1.5 SR2$
$m12 = g2 + RSC1 + RSC4 + a1 + a2 + a3 - .5 SR1 - .5 SR2 - .5 SR3$
$\vdots$
$m54 = g4 + RSC5 + RSC10 + a5 + a6 + a7 + a8 + a9 + 1.5 SR5 + 1.5 SR6 + 1.5 SR7 + 1.5 SR8 + 1.5 SR9$
FIG. 29

$$\overline{g}_1 = \frac{m11 + m21 + m31 + m41}{4}$$

$$\vdots$$

$$\overline{g}_4 = \frac{m14 + m24 + m34 + m44}{4}$$

FIG. 33

$$\overline{a}_5 = \frac{m23 - m22 + m32 - m31 + m53 - m62 + m54 - m63}{4} \quad {}^{474}$$

FIG. 34

$$RSC_5 = \frac{\begin{array}{l}m22 - g2 - (a2 + a3 + a4) + m31 - g1 - (a3 + a4) + \\ m51 - g1 - (a5 + a6) + m52 - g2 - (a5 + a6 + a7) + \\ m53 - g3 - (a5 + a6 + a7 + a8)\end{array}}{5} \quad {}^{490}$$

$$= \frac{R22 + R31 + R51 + R52 + R53}{5}$$

FIG. 35

$$\overline{SR}_5 = \frac{\begin{array}{l}-.5(m32 - m22) - 1.5(m41 - m31) + 1.5(m61 - m51) + \\ .5(m62 - m52) - .5(m63 - m53)\end{array}}{5} \quad {}^{504}$$

FIG. 36

METHOD AND APPARATUS FOR DETERMINING THE MAGNITUDE OF COMPONENTS OF MEASUREMENTS MADE FROM INSIDE A BOREHOLE

FIELD OF THE INVENTION

This invention generally relates to the factorization of measurements and more specifically to a method and apparatus with which measurements made at different depths from inside a borehole penetrating an earth formation can be separated into individual components.

BACKGROUND OF THE INVENTION

Factorization of seismic velocity- measurements has been described in the art to improve the ability to identify subsurface reflections. An original article describing such technique is entitled "Residual Statics Analysis as a General Linear Inverse Problem" by Ralph Wiggins, et al and published in *Geophysics*, Vol. 41, No. 5 (October 1976) at pages 922–938.

In accordance with the technique described in the latter article a model of the factors of subsurface travel times is made and includes an estimate of the contributions attributable to statics, residual normal moveout (RNMO) and other structural features. A set of linear simultaneous equations is then generated for a range of shots and receiver measurements. A solution of these equations is made with an iterative method known as the Gauss-Seidel iterative technique that is applied to the set of linear simultaneous equations that make up the time measurements which in turn are made at overlapping intervals over a surface distance.

The seismic technique factors time measurements into time delay factors that have physical significance such as the time needed to traverse a near-surface region before seismic waves reach reflectors of interest. The seismic technique is based on the reflection of seismic waves from deep earth events and, is not useable in a borehole investigations such as the measuring of slowness of the earth formation. In a slowness investigation the sonic waves are refractively coupled to and from the earth formation in their travel from a source to a receiver.

In an article entitled "Investigation of Travel Time For Velocity" by M. E. Willis prepared and presented in 1983 under the auspices of the Earth Resources Laboratory of the Department of Earth and Planetary Sciences of the Massachusetts Institute of Technology, estimates of the slowness of the earth formation around a borehole and the travel times through the borehole are obtained using an iterative technique. This is applied to a matrix to converge to estimates of slowness values based upon initial estimates The initial values for earth formation slowness are obtained by determining the moveout between receivers and is corrected for tool tilt. The initial values for borehole radius are obtained from a caliper log. The solution requires a recalculation of the matrix during convergance and thus a large memory and is described as slow when applied to data for large depth ranges as are typically encountered in borehole logging.

In an article entitled, "Inversion of Travel Time for Velocity using Multi-Spacing Sonic Tools," by B. J. Paternoster and prepared by the same M.I.T. source as for the above Willis article, a recursive technique is described to determine earth formation transit times and velocities. A high resolution is stated to be achieved by using arrival time measurements that are repeated at fractions of the source-receiver spacing and employing a recursive least squares inversion based on the Kalman filter. Mud travel times are neglected.

SUMMARY OF THE INVENTION

With a method and apparatus in accordance with the invention, quantitative high depth resolution investigations of different earth formation characteristics can be made. For example, high resolution measurements can be made of the earth formation acoustic slowness, and indications are obtained for the acoustic coupling from the mud into the earth formation, the depth to which borehole mud has invaded the surrounding earth formation and earth formation attenuation of an acoustic wave.

As described herein for one method and apparatus in accordance with the invention measurement of the travel times of an acoustic wave, such as the compressional, through the earth formation, are factored into components. These include the travel times, $T_m$, through the mud inside the borehole and the travel times, $T_i$, through the earth formation as may be expressed in slowness values. These travel times are determined with a consistently high resolution that approaches the small spacings between acoustic receivers used on the acoustic investigation tool.

This is achieved with an acoustic investigation tool having a plurality of spaced-apart acoustic receivers so that detected acoustic waveforms for a particular depth range have a redundancy; i.e., the acoustic waveforms traversed overlapping depth intervals. The first motions in the waveforms are detected and used to produce slowness measurements. A model is then formed whereby for each travel time measurement a plurality of components is defined whose sum is equal to the measurement with at least one component, such as slowness representing an earth formation characteristic. A system of linear simultaneous equations is, formed for all measurements within a depth range and by way of an iterative process values of the components are determined.

Various techniques are described to enhance the iterative process whereby a substantial reduction in sensitivity to measurement error such as cycle skipping is obtained.

With a method and apparatus in accordance with the invention an indication of the extent of penetration into the earth formation of the interval travel time measurements is derived. This is obtained by defining an interval travel time component that is a function of source to receiver spacings and iteratively solving for this factor.

In another technique in accordance with the invention a measurement of the amplitudes of selected waves such as the compressional arrival is made. The amplitudes are then factored into primary components or factors: such as, the source and receiver acoustic couplings to the formation, RSC; the acoustic transmission loss or attenuation through the earth formation, a; and the gain, g; of individual receivers. A secondary component that is determined is the effect of the alteration of the earth formation by the borehole fluid and is indicated by a factor, SR. The SR factor is sensitive to source to receiver spacings.

These components can be determined as a result of the presence of redundant information from the multiplicity of overlapping tool positions during logging of a borehole. With a technique in accordance with the invention it is particularly advantageous to determine the gain of the receivers since this is in effect a calibration that can be done after the measurements have been made.

This is obtained by conducting an investigation from inside a borehole with a tool so that a plurality of amplitude measurements are generated over a depth range with the measurements covering overlapping depth intervals. Different factors that make up the amplitude measurements and coefficients for each factor at each depth are defined and the coefficients are arranged in a matrix. The values of the factors at each such depth are then determined using an iterative technique and the values recorded as a function of borehole depth.

With techniques in accordance with the invention, earth formation characteristics can be more precisely determined. Unrelated components can be removed from measurements to reveal the value of the characteristic of interest with high resolution. For example, slowness as determined with a conventional tool includes the durations of the travel times of the waves through the mud in the borehole. These mud travel times can, according to the invention, be factored out and recorded while leaving the remainder as a more accurate measurement of the earth formation travel times.

Since mud travel times normally remain fairly constant, though gradually changing as a function of pressure and temperature, cave-ins show as unusual features in a log of mud travel times. Such cave-in is not always detectable from a conventional caliper signal indicative of the borehole diameter.

With a technique in accordance with the invention, the resolution of the earth formation slowness measurements can be high; namely, that of the interreceiver spacing used on the tool. As a result slowness logs made according to the invention reveal small spatial events that are not masked by processing techniques.

When amplitude measurements are factored into components using a technique in accordance with the invention, various lithology and fracture indications can be derived. For example, the measurement of the amplitude of the compressional wave can be factored into various components, one of which a, is an indication of transmission loss or attenuation, another is the coupling factor, RSC, representative of the effectiveness by which acoustic energy is coupled from the acoustic source into the earth formation and coupled back therefrom towards the receivers. The coupling factor reflects the acoustic impedance contrast between mud and the formation and thus is indicative of the relative hardness of the surrounding formations.

Another component that can be factored from the amplitude measurement is indicative of the invasion of the mud into the adjoining formation. This component, SR, varies with the source to receiver distance The SR component may be used to probe mechanical properties, such as stress relief around the borehole, and the extent of the fluid invasion may be a good permeability indicator Factorization of amplitude measurements of a sonic wave is advantageously obtained in one embodiment in accordance with the invention by first precisely determining the location of the wave in the waveforms. This is done by correcting an initial wave location determination with travel time measurement of that wave as obtained from a factorizing process. Once the sonic wave is precisely located, the waveforms are passed through a filter, such as a fan filter, in a manner whereby mode conversions and interferences are removed. The amplitude of the wave is then measured and factorized into components for waveforms related to a particular depth range by using a linear model. This employs a large number of simultaneous linear equations respectively applicable to different depths with the coefficients for the components being unknown. An iterative process is then used, such as the Gauss-Seidel iterative technique, to determine values representative of the components as a function of depth. Techniques are applied to reduce end-effect problems, reduce the number of iterations needed to derive the components, and reduce the effect of measurement errors, such as from cycle skipping during first motion detection.

It is, therefore, an object of the invention to provide a method and apparatus for factorizing measurements derived from an investigation made from inside a borehole. It is a further object of the invention to provide a technique for calibration of devices used in generating measurements from inside a borehole. It is still further an object of the invention to provide a method and apparatus for improving the measuring of slowness values for an earth formation as well as to obtain indications of the attenuation of an earth formation alongside a borehole, the coupling effectiveness of acoustic waves with the earth formation, and the degree of invasion of the mud into the formation.

These and other advantages and objects of the invention can be understood from the following description of several embodiments as described in conjunction with the drawings.

BRIEF DESCRIPTION OF DRAWINGS

FIG. 1 is a schematic diagram, flow chart and display obtained with a technique in accordance with the invention to improve the measuring of slowness values from sonic measurements made with a tool from inside a borehole;

FIG. 2 is a schematic diagram of sequential operations of an exemplary tool used to investigate an earth formation;

FIG. 3 is a block diagram of a technique used to determine slowness values from an acoustic investigation of an earth formation with a tool as shown in FIG. 2;

FIGS. 4A and 4B are diagramatic views of matrices of coefficients used to factorize time measurements;

FIG. 5 is an abbreviated listing of linear simultaneous equations applicable to the matrix shown in FIG. 4A, FIG. 6 is an abbreviated listing of linear simultaneous equations applicable to the matrix, a difference matrix, shown in FIG. 4B;

FIG. 7 is a listing of an iterating step used in determining a component value for the simultaneous equations of FIG. 5 for the matrix in FIG. 4A;

FIG. 8 is a listing of an iterating step used in determining a component value for the simultaneous equations of FIG. 6 for the matrix in FIG. 4B;

FIG. 12A is a visual representation of one acoustic travel path model;

FIG. 12B is a visual representation of another acoustic travel path model;

FIG. 12C is a partial view of a matrix used to determine time components using the model of FIG. 12B;

FIG. 27 is a schematic diagram of exemplary sequential operations of an acoustic investigation tool over a particular depth range;

FIG. 28 is a diagrammatic view of a matrix used to factorize the amplitude measurements made from the operation as shown in FIG. 27;

FIG. 29 is a partial listing of linear simultaneous equations of components that make up the measurements shown in matrix of FIG. 28;

FIG. 30 is a diagrammatic view of a matrix used to obtain an attenuation component;

FIG. 31 is a diagrammatic view of part of simplified matrix derived from the matrix of FIG. 28 and used to determine components indicative of the extent of the mud-altered zone of the earth formation;

FIGS. 33–36 are partial listings of steps used in an iteration process to obtain values respectively for gain, coupling, attenuation, and mud invasion components.

DETAILED DESCRIPTION OF DRAWINGS

Figure 9:
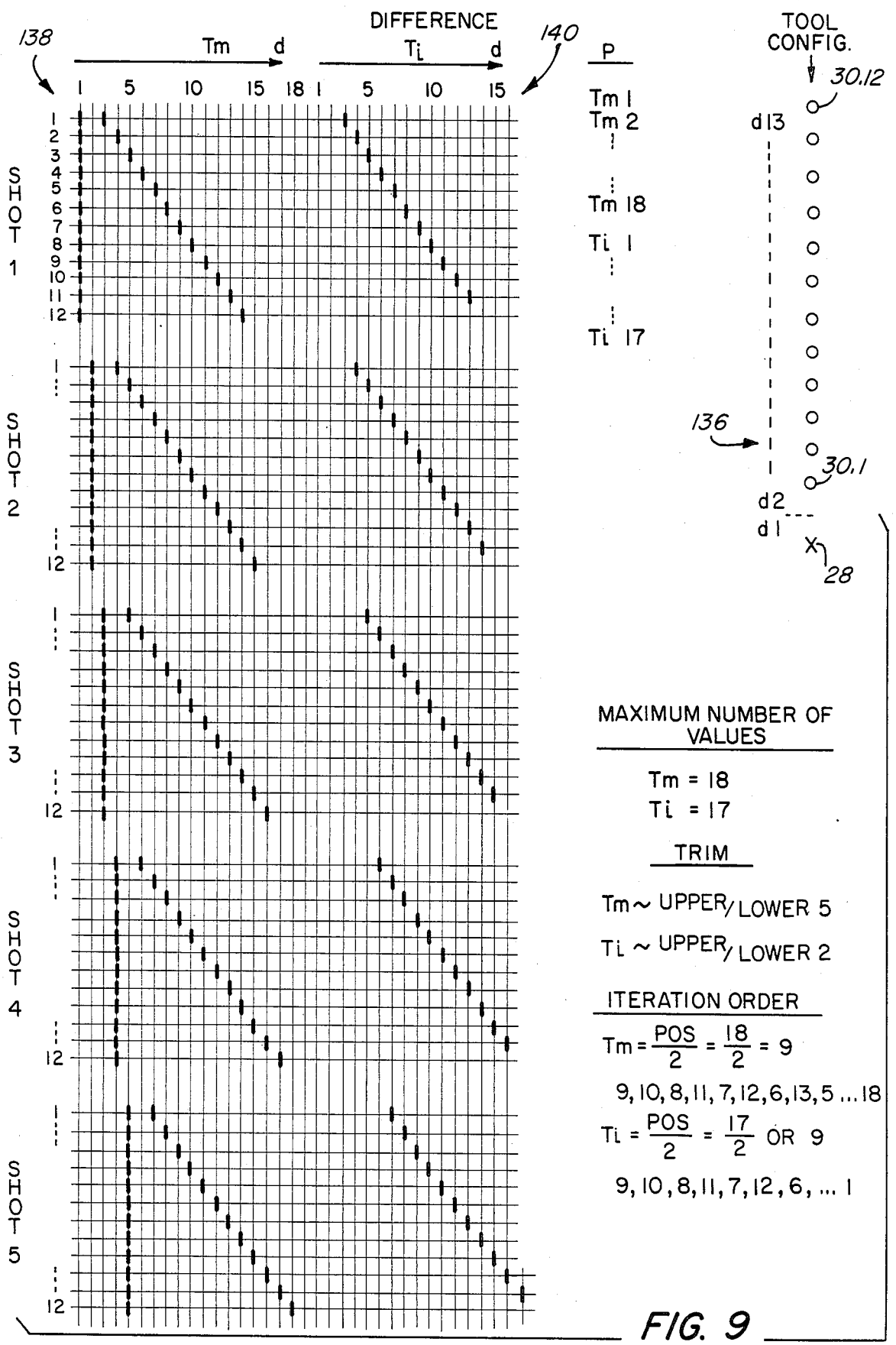
FIG. 9 is a diagrammatic view of a portion of difference matrices used in accordance with the invention in obtaining time component values with a large acoustic receiver array tool.

With reference to FIG. 1 a tool 20 is shown suspended from a cable 22 inside a borehole 24 penetrating earth formation 26. Tool 20 may use various forms of energy to investigate the earth formations such as nuclear, electromagnetic or sonic pulses. In FIG. 1 the tool 20 is an acoustic investigation tool having a source 28 for generating acoustic pulses and a plurality, say twelve, receivers 30.1–30.12. The receivers 30 are vertically spaced from each other by the same distance, d, and the source 28 is at a known multiple of the receiver spacing d from the nearest receiver 30.1. Other non-uniform spacings d can be used. The source 28 is activated at a sufficiently high rate so that there are source activations (shots as they are commonly called) which occur, after displacements of the tool 20 is close to the receiver spacing intervals d as tool 20 is pulled up by cable 22.

The activation of transmitter 28 introduces acoustic waves into borehole 24 and some of these travel along a path 36 to the receivers 30. Path 36 includes mud segments 38, 40, respectively, at the source 28 and receivers 30 and formation segments 42.0–42.1.

Formation segments 42 are shown as straight lines that are generally parallel, to the wall 44 of the borehole. In practice the path segments 42 are likely to lie more deeply into the earth formation with increased receiver to source spacings. For the purpose of determining slowness values with this embodiment, the path 36 as shown in FIG. 1 is used.

As acoustic waves are detected by receivers 30, they generate electrical waveform signals that are preferably but not necessarily digitized downhole in tool 20. The digital samples are sent along cable 22 to a surface located signal processor 46. A depth signal from a cable-coupled depth sensing device 48 is applied on line 50 to signal processor 46.

A technique 52 is then entered whereby the waveforms generated by the receivers 30 are processed to derive slowness values by way of a factorizing process. This commences at 54 with the reading in of waveforms derived from an investigation extending over a substantial depth range.

A first motion detection process is applied at 56 to the waveforms. First motion detection is wellknown and is conventionally done by sensing when a waveform first exceeds a predetermined threshold level. When conventional first motion detection techniques are applied, a common problem arises as a result of cycle skipping effects as illustrated in the display 60 of the recording of first motions in each of the different waveforms from receivers 30.1–30.12. Cycle skipping can be noted such as at 64.1 and 64.2 in display 60.

The first motions detected at 56 are used to determine the total time it took, from the time source 28 was fired, for the first part of the compressional wave to arrive at a receiver 30. Since the time that source 28 is activated is known, the term "first motion detection" as used herein also means travel time for a wave from the time the source 28 is initially activated to the time the wave is detected.

At 66 a travel time model based on the compressional travel path 36 is made. The model uses the first motion detections from step 56 and equates each first motion measurement to the sum of the travel times involved. Thus, the first motion detected from receiver 30.1 includes the sum of travel times through the mud at transmitter 28 for path 38, the travel time over formation path 42 and again a mud path 40.1 to receiver 30.1. The model thus includes a set of all of the linear equations respectively applicable to the depth intervals for the entire depth range to which the waveforms relate.

At 68 the set of linear simultaneous equations is solved so that the first motions are factorized into the different components that are involved. The redundancy that exists in the time measurements enables a special iteration process to determine all of the travel time components. At 70 a log 72 of the formation slowness values is made while the first motions are reconstructed at 74 for each of the depth intervals with the factorized components. Such reconstruction may, for example, be done by adding the appropriate component travel times of the compressional wave from the transmitter 28 to a receiver 30. Further subsequent processing techniques, such as cross correlation processing can be done to further refine the first motion, detection. The display 62 illustrates the effectiveness of the factorization process in that it enables the elimination of all the cycle skippings shown in display 60.

Alongside log 72 is a log 75 made for the same depth range, but with a conventional slowness measuring tool known as the BHC (borehole-compensated-tool). The log 72 shows much sharper segments such as at 76.1 and 76.2 in comparison with those in, log 75. The resolution of the factorized slowness values is very high, of the order of about six inches which is the spacing employed between receivers 30. Other spacings can be used.

FIGS. 2–4 provide an illustrative example of the technique used in accordance with the invention to factorize the time measurements into mud travel times, Tm, and depth interval travel times, Ti. In FIG. 2 a tool configuration 80 is shown involving four receivers, 30.1–30.4 and one transmitter or source 28. For clarity the depth range is limited to five successive tool shots at locations 82.1–82.5. The model established at step 83, and which describes the linear relationship between the time measurements m and unknown factors, is $A^*p=m$ for a depth range D of 10 locations separated by nine equal inter-receiver intervals d that are respectively identified as d1–d9. A is a matrix 84 (FIG. 4A) of coefficients for a vector p that contains all the unknown factors that need to be estimated and $m_{ij}$ denotes the time measurement at the jth receiver from the ith shot. As can be seen, most of the coefficients in the matrix are zero, as represented by either horizontal dashes or the intersections of the light grid lines such as at 86.1.

The unknown factors in the example for the depth range D of 10 locations 82 include mud travel times (Tm1–Tm10) and interval travel times (Ti1–Ti9) for a total of nineteen unknown factors for depth range D. The source and receiver mud travel times are combined to appear as a single factor because these should be substantially equal at the same depth location, even though the refraction angles of the acoustic wave of interest may differ somewhat at the source and receiver. Note that the depth dimension runs horizontally in matrix 84 while the vertical dimension is determined by the number of measurements m made as a function of depth.

FIGS. 5 and 6 partially illustrate the sets of linear simultaneous equations that, apply to the respective matrix models 84 and 85 shown in FIGS. 4A and 4B. Thus, the first motion measurement m11 is equal to the sum of its individual components: namely, Tm1 and Tm3, the travel times through the borehole mud at source location 82.1 and at 82.3 and the components representative of the travel time through the earth formation 26 between the source 28 and receiver 30.1. The latter travel time component is divided into components for equal receiver spacing d; namely, Ti1, Ti2. Slowness values bearing dimensions of time per distance are obtained by dividing the travel times by the distances involved.

Solutions to the linear simultaneous equations represented by matrices 84 and 85 are obtained by using a Gauss-Seidel iteration technique. Iterations, as will be further explained, are performed by averaging all measurements, after they were multiplied by the coefficients in one of the vertical columns thus in effect combining measurements related to a common depth interval. The convergence rate of such technique, however, is sensitive to the sparseness of the matrix. For example, in matrix 84 the mud travel time coefficients Tm are deemed as relatively sparse since in the addition of coefficients in any one column mostly zeroes are encountered. Note that the coefficients are shown as equal to either one or zero. However, other values can and should be used when the model requires that.

In case of the interval travel times, however, the matrix 84 is much more dense, and such density has been found to affect the ability to converge to a value other than noise. Accordingly, at 90 the matrix 84 is modified, and a difference matrix 85 is formed. Matrix 85 is formed by subtracting one measurement from an adjacent measurement; for example, m12–m11 and m12–m21, etc., thus measuring differences between waveforms due to the same shot as well as differences between waveforms from different shots but related to overlapping depth intervals. The arrows 93 and 95 in FIG. 2 indicate how such difference matrix 92 is generated by forming differences between predetermined sets of measurements and related coefficients. The modified matrix 85 has interval travel time coefficients which are sparsely distributed and thus substantially sparser than the corresponding portion in matrix 84. The coefficients for the mud travel time with a dash beneath them signify a negative value.

At 94 the interval time factor is determined using the sparse difference matrix 85 and using a modified form of Gauss-Seidel iterations as will be explained with reference to a trimming step shown in FIG. 11. Once the values for the interval travel time components Ti have been determined, the mud travel time components can be found using the original matrix 84.

The original matrix 85 can be used after subtracting, from the measurements m, the contributions of the interval travel time Ti as determined at 94 with matrix 85.

Figure 10:
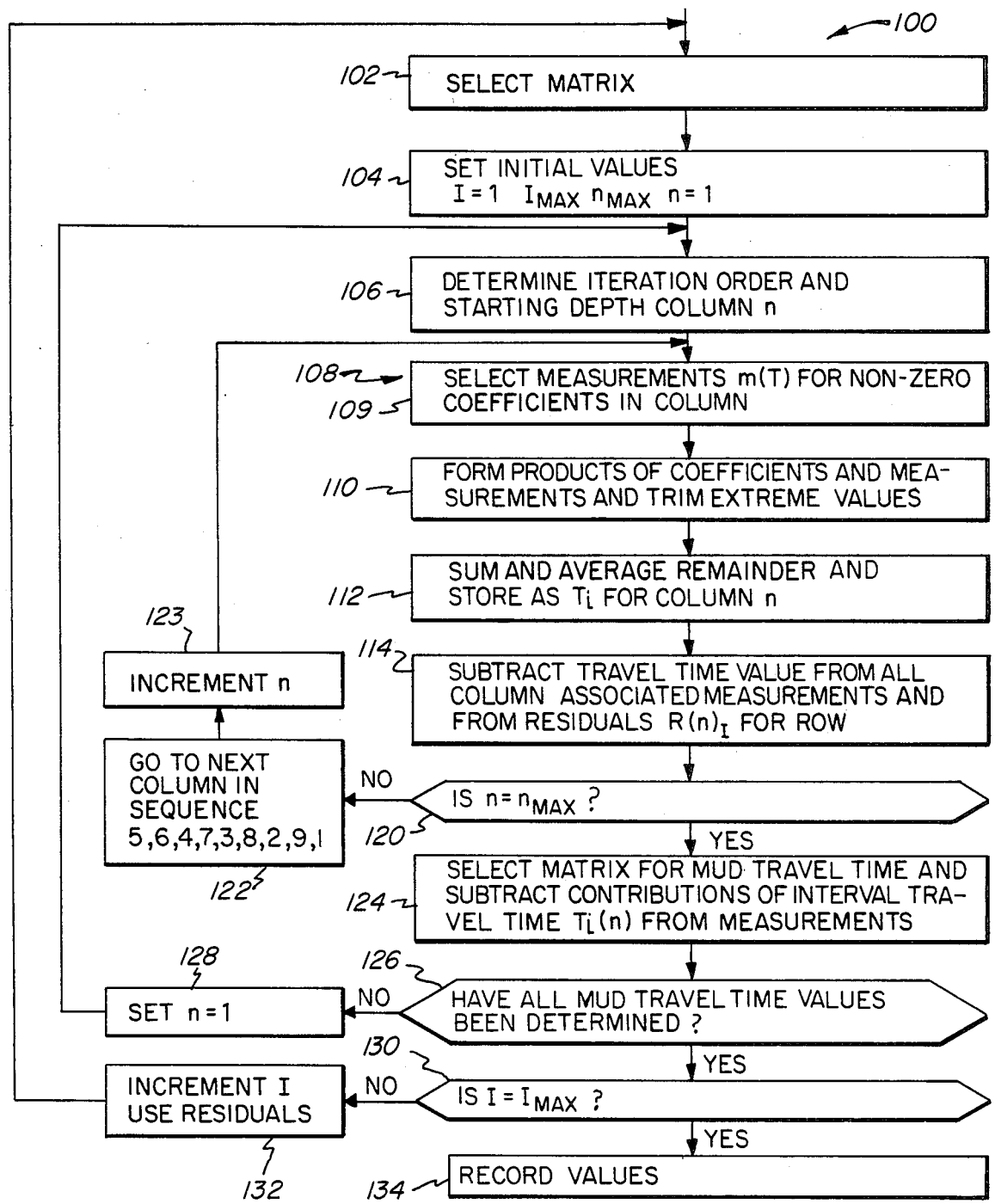
FIG. 10 is a flow chart of an iteration technique in accordance with the invention.

Solutions to the linear equations as shown in FIGS. 5 and 6 are obtained by using Gauss-Seidel iterations as shown at 100 in FIG. 10. At 102 matrix 84 is selected and a first iteration is entered, for the interval travel time Ti using the matrix 85 in FIG. 4B. The order in which components of the travel times are determined is important and requires that the earth formation interval travel time components, Ti, be determined first. Initial values are set at 104.

The first iteration is selected to minimize end effects. In practice that means starting in the central region of the depth range D or about the fifth depth interval Ti, with subsequent processing of columns being done alternately above and below the central region so that the outer columns Ti(1) and Ti(9) are processed last.

The first column is selected and is chosen at 106 to be centrally located in the depth range D as defined by n, the number of depth positions. If n is even, the location is n/2. If n is odd, it is the column that is central from both ends. In case of a very large matrix involving hundreds or thousands of depth intervals, the first column need not be in the exact center. Starting of the iteration process in this central region tends to reduce end-effects.

At 108 a trimming process is entered by which extreme measurement values are rejected and in effect moved into the residuals. The first step involves the selection at 109 of the non-zero measurements m related to an associated depth or column. In case of the interval travel time Ti(5) for FIG. 2 this includes six measurements m14–m13; m23–m22; m32–m31; m52–m61; m53–m62; and m54–m63 by, using matrix 85 of FIG. 4B and measurements from a sixth shot.

At 110 products of coefficients and measurements related to the column are formed and those indicative of excess values are excluded from the averaging process. For example, those measurements which are in the median fifty percentile range are retained for subsequent averaging and the upper and lower quartiles excluded. Different trimming criteria can be used. This trimming process in effect excludes large time measurements that included cycle skipping as shown in FIG. 1 in display 60.

The trimming process requires that a minimum number of measurements m be available in any one column, thus avoiding a trimming step involving but a few measurements. A test can be adopted to use the trimming step only if at least three or more measurements are available for an iteration and otherwise bypassing the trimming operation. Preferably at least about ten measurements should be available and this normally would be the case for a twelve receiver tool.

A column average, Ti(5) using the remaining measurements in column Ti(5) is then determined as follows. The products of coefficients in the column Ti(5) and their respective associated measurements m, are summed, averaged and then stored at 112 as shown for example by the trimmed relationship 116 in FIG. 8 and applicable to column Ti(5). Note the simplification of relationship 116 in FIG. 8 using matrix 85 with a comparable relationship 118 in FIG. 7 using matrix 84 of FIG. 2. The first and last measurements were trimmed away. This column average is the first value for the interval travel time Ti related to this depth and is to be accumulated with values derived from subsequent iterations using residual values The contribution by the column average Ti(5) to respective measurements is then subtracted at 114 from all the measurements associated with column Ti(5) to leave different residuals values $R(n)_I$, see FIG. 4B, where R is the magnitude of the residual, n represents the column and I the iteration.

At 120 a test is made whether other columns need to be processed. If so, the process proceeds to the next column at 122 and the column selecting flag n is incremented at 123. In practice column averages Ti(n) are developed in a particular order such as shown at 122 for the embodiment of FIG. 2. Steps 109, 110, 112, 114 are then repeated. The sequence by which columns are processed may be varied. Preferably the sequence involves a general alternation between columns that are below and above the start location in the central depth region. The alternating can be done every other column.

When Ti(n) values for all columns or depths have been determined, at 124 the sparse matrix 84 in FIG. 4A is selected and the contributions of the values for Ti as determined at 112 are subtracted from the measurements in matrix 84.

For example, the values of the interval travel times Ti1 and Ti2 are subtracted from measurement m11, Ti2, Ti3 and Ti4 are subtracted from m12, etc. for all measurements m in the range. The remaining measurements are residual values R that are then used to determine the mud travel times Tm using the steps 106–120 after a check is made at 126 whether all mud travel times have been determined and the column variable n is reset at 128.

A check is then made at 124 whether another iteration is required. If so, after incrementing the iteration variable I at 132 a return is made to step 102 and, while using residual values R(n), incremental values for the interval travel times Ti mud travel times Tm are obtained for the columns and respectively added to the previously determined values. The criteria for test 130 can be a fixed number of iterations or a minimum average value for all the residual measurements.

Upon completion of the process 100 in FIG. 10, values for the interval travel times, Ti, as a function of depth are obtained and may be visually recorded at 134 to form a display as at 72 in FIG. 1.

The advantages of the Gauss-Seidel iterative process as modified in accordance with the invention can be appreciated with reference to the matrices of FIG. 9. The matrices in this figure are based upon a tool configuration 136 which includes one sonic transmitter 28 separated in this example, by two depth intervals d from the first of twelve sonic receivers 30.1–30.12. In practice the transmitter/receiver separation is usually about ten to sixteen intervals.

The depth range D is limited for clarity and space reasons to five shots or five different transmitter locations. The matrices included an original matrix 138 for the mud travel times Tm and a difference matrix 140 for the interval travel time Ti. These matrices are derived in the manner as described with reference to FIGS. 4A and 4B except that for clarity and drawing space limitations the difference matrix 140 does not include coefficients for differences between waveforms forms from different shots and the measurements m are not shown. The total number of unknown components is 35, formed of 18 mud travel times and 17 interval travel times while providing 60 linear simultaneous equations.

Figure 11:
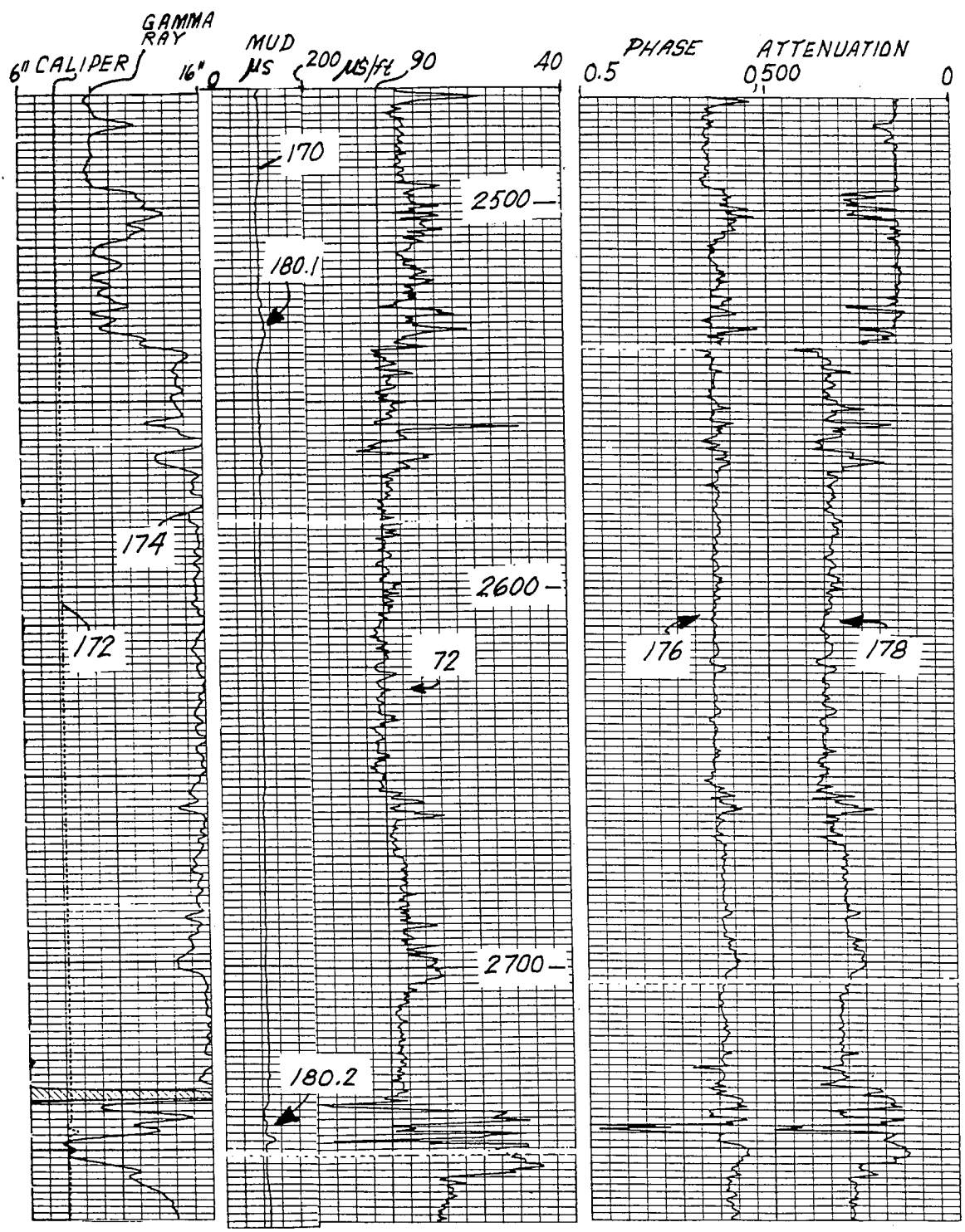
FIG. 11 is a display of various logs of different parameters including slowness values obtained in accordance with the invention.

The advantages of the factorizing of travel times of the compressional arrival can be particularly appreciated with reference to FIG. 11. In this Figure, the slowness of the compressional wave as derived with the invention is shown in a display 72 together with a log 170 of mud travel time Tm for the same depth range as well as a caliper log 172, a gamma ray log 174 and high resolution electromagnetic propagation logs 176, 178. The high resolution characteristics of the formation travel times are confirmed by the traces 176, 178. Of particular interest is the mud travel time at 180.1 at about 2,530 feet. At this depth region an increased mud travel time is recorded, indicative of a cave-in. The logs 176, 178 confirm the presence of an anomaly. At 180.2 at about 2,745 feet both conformance to and variations from the caliper measurement are indicated.

The matrices described with reference to FIGS. 4A and 4B are based on a model of acoustic propagation which assumes rectilinear acoustic paths through the formation between the transmitter 28 and receivers 30, as shown in FIG. 12A. In this model the energy arriving at each receiver has traversed a path 186 with the same penetration depth into the formation as the energy arriving at other receivers. However, Applicants believe that a more sophisticated model is that as shown in FIG. 12B, in which the energy arriving at receivers 30 farther from the transmitter 28 has traversed paths extending deeper into the formation than energy arriving at closer receivers. Consequently, as indicated at 188, the distance traversed by the acoustic energy over a portion of the formation is longer than would be suggested by the simple rectilinear model as at 186.

The matrix of FIG. 4A may be modified as shown at 190 in FIG. 12C to take account of this deviation from rectilinear propagation. Specifically, nine factors f1-f9 are introduced at 192 in the vector p in addition to the existing factors Tm1-Tm10 and Ti1-Ti9. The matrix 190 of coefficients has been expanded compared to matrix 84 in FIG. 4A by the addition of nine new columns corresponding to factors f1-f9 which are related to the transmitter-receiver spacings. The non-zero values of these coefficients occur at positions in the matrix corresponding to those of the non-zero coefficients for the formation travel time factors Ti1-Ti9. FIG. 12C shows at 192 the enlarged vector p and the first four rows of the expanded matrix 190 by way of example. The values for the additional coefficients are derived by comparison of the actual spacing of each receiver from the transmitter with the mean spacing of all the receivers. In the example shown this spacing is 3.5 intervals. Thus, the nearest receiver is at a distance of −3.5 intervals relative to the mean, whereas the furthest is at a distance of 1.5 intervals relative to the mean.

In an iterative solution of matrix 190 a difference matrix can be produced as described with reference to FIG. 4B. The order by which values for factors are solved is Ti, Tm and then f.

Figure 13:
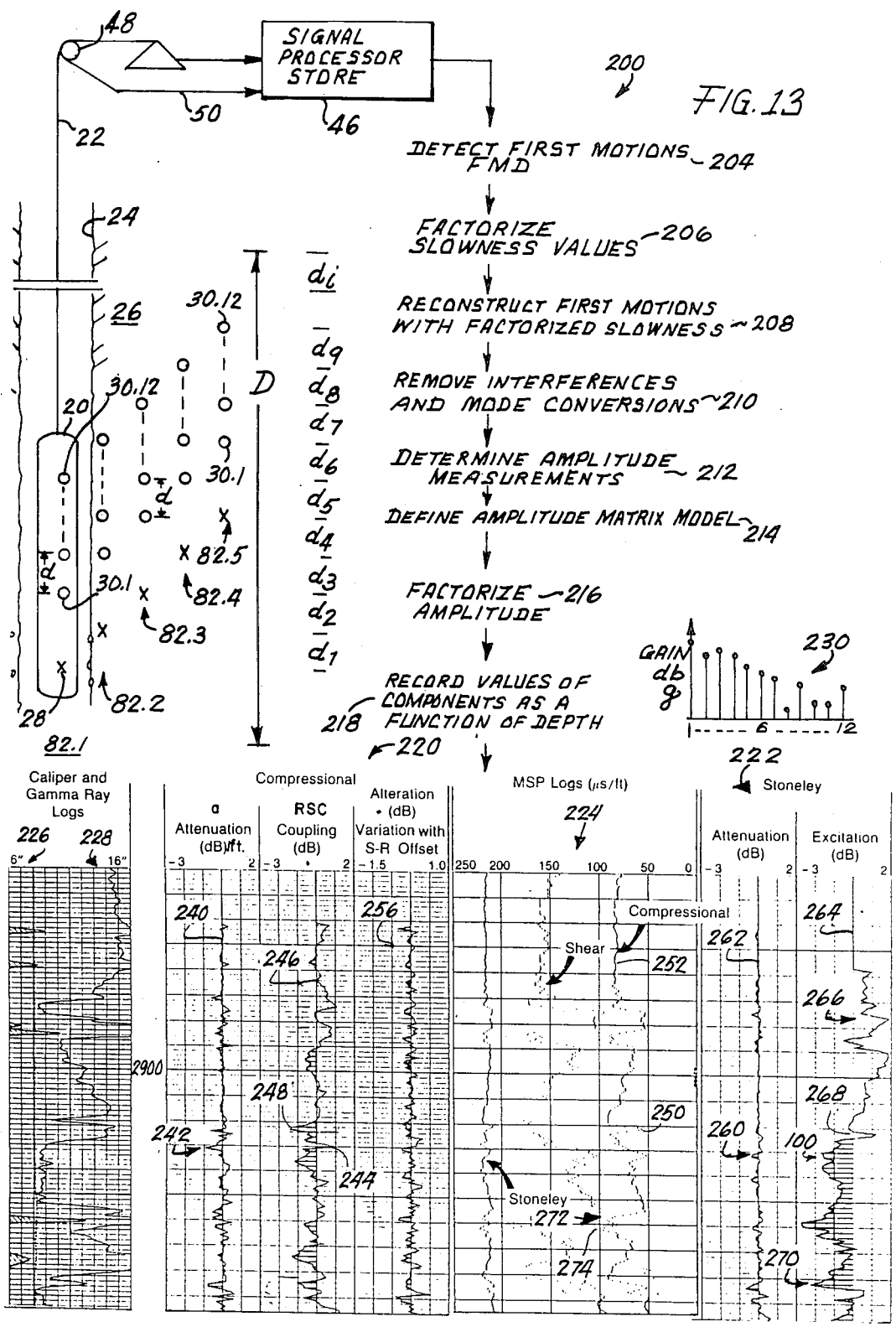
FIG. 13 is a schematic diagram, flow chart and display of a technique in accordance with the invention to factorize time measurements and compressional and Stoneley wave amplitudes.

FIG. 13 illustrates a technique 200 whereby both various first motion detections and compressional amplitude can be factorized into components and features of interest can be identified. Similar to the tool shown in FIG. 1, FIG. 13 shows a tool 20 with a sonic transmitter 28 and twelve sonic receivers 30. The tool 20 is, for illustration purposes, shown in five successive positions 82.1-82.5 corresponding to five shots from source 28. The full range of the investigation involves a depth range D as illustrated in the visual display logs in the figure, though for clarity and explanation a small depth range is shown formed of ten positions and nine depth intervals d.

First motions for the acoustic waves of interest are determined at 204 and at 206 are factorized into components.

At 208 the previously determined slowness components used to reconstruct the compressional first motions for each of the waveforms so that the waveforms can be accurately aligned and portions that contain the amplitude of interest can be extracted. At 210 the waveforms are passed through a filter to remove interferences and mode conversions.

Amplitude measurements are then made at 212 of extracted compressional and Stoneley waves. The amplitude measurement can be the peak value of a particular part of an arrival, such as the first positive going peak, or it can be such other value of a waveform such as amplitude as a function of frequency. The term "amplitude" as used herein, therefore, can mean the energy content or energy received from or attributable to a source, or the rms value of such received energy or the magnitude of a particular frequency or such other value that is representative of a magnitude of received energy. The amplitude measurements may be expressed in decibels.

In case of a compressional arrival its amplitude can be represented by determining the magnitude of the first peak after cross-over: namely, after the time of first arrival. In case of the Stoneley wave its amplitude can be derived in the manner described in U.S. Pat. No. 4,131,875.

The Stoneley wave may be extracted as described in U.S. Pat. No. 4,131,875 by applying a low pass filter V (0-5 kHz for example) to isolate this wave from the compressional and shear waves, followed by applying a finite duration window. Another method for determining the location of the Stoneley wave may use a technique known as slowness time coherence processing with time windowing.

After step 212 there are amplitude measurements, $m_{ij}$, with i referring to the particular shot 82 and j referring to the particular receiver 30, for the compressional and Stoneley waves at each depth interval.

At 214 amplitude matrix models are generated to define $m_{ij}$. These factors may be initially defined at the start of technique 200 with which the signal processor 46 operates. The factors depend upon the nature of the measurements.

In the case of amplitude measurements for the compressional wave, the factors include a calibration factor such as receiver gain, g, to reflect unequal gain or sensitivity of the receivers 30. Attenuation in the mud, rugosity of the borehole wall and the impedance contrast between the mud and the earth formation affect how much energy is coupled into the earth formation (at the transmitter side) or couples into a receiver (at the receiver side) and thus define a combined receiver and source coupling factor RSC. This factor is thus indicative of the effectiveness of the transfer of a wave at the boundary between the borehole and the earth formation. The propagation through the earth formation is influenced by intrinsic rock attenuation, bed boundary reflections, mode conversions, and earth formation alterations of the acoustic energy and are grouped together as an attenuation factor, a.

Another factor that has been identified is an effect attributable to different source to receiver spacings SR. This SR factor reflects radial variations in velocity of the compressional wave as a linear function of the transmitter and receiver spacing. Hence, deeper and thus different regions in the earth formation 26, which are less likely to have been altered by invading mud from the borehole, may affect the compressional wave differently. The SR factor establishes a value for that.

Step 214 includes the generation of a matrix of coefficients for each factor that makes up part of a measurement and for all of the measurements over a depth range D. Stated generally, an amplitude measurement from a receiver waveform is composed of terms in accordance with the following general relationship: $m = g + RSC + a + SR$, where g is receiver gain applicable to the particular receiver from which the measurement was made, RSC is the combined effect of the source and receiver couplings, a is the transmission loss or attenuation associated with the distance between the source and the receiver and is broken into depth interval terms $a_1$, $a_2$, $a_3$, etc., as the case may be. SR is a single "earth formation alteration" factor associated with the source to receiver spacing and represents a secondary effect. The result is a large number of linear equations with a large number of unknown factors.

The values of the factors are determined at 216 by applying a Gauss-Seidel iteration over the depth range of interest and recording the values as a function of depth at 218. The recording may be on a magnetic medium, but is of interest when plotted as shown at 220 and 222 as a function of depth alongside other measurements such as the slowness values at 224, a caliper measurement 226 and a gamma ray log 228. Except for the gain factor values, g, the other amplitude components provide indications of local variations and do not include absolute values. This is because the solutions of the simultaneous equations shift the DC components into the first iterated values for the gain components.

All the unknown factors in the measurements except receiver gains, g, are functions of depth. The receiver gains g, therefore, can be recorded in a manner as shown at 230 and illustrate that even if the sonic tool is not carefully calibrated before logging, the recorded waveforms can still be calibrated.

Figure 26:
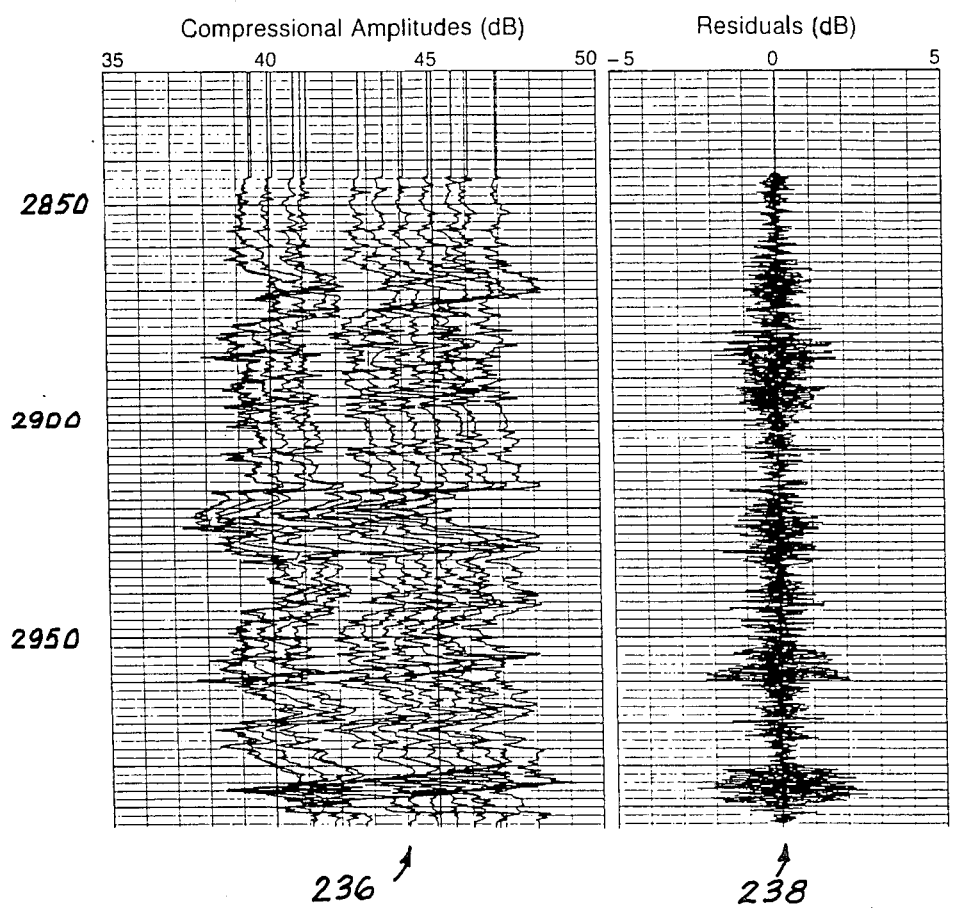
FIGS. 26 is a display of waveform amplitudes and residual values remaining after factorization in accordance with the techniques of FIGS. 13 and 15.

The effectiveness of the factorization technique can be appreciated with reference to FIG. 26. Here the amplitude values of the received compressional waves are recorded at 236. The residuals of these same waves are recorded at 238 after subtraction of gain, attenuation, coupling and SR contributions from these measurements. The peak-to-peak variations of the residuals are less than 1 dB through most of the whole depth interval and are generally more than 40 dB down from the amplitude measurements as shown at 236. The residuals have a random character and demonstrate that more than about 99 percent of the wave energy in the measurements is properly modeled by the g, RSC, a, and SR terms.

The visual log 220 in FIG. 13, has a number of characteristics that are noteworthy. For example, the compressional wave attenuation log 240 shows at 242 an attenuation of about 1 dB/ft at 2931 feet in the fractured zone as indicated by the peak 244 at 2930 feet in the coupling log 246. This attenuation measurement may be useful to evaluate permeability. The compressional attenuation log 240 is a valuable tool to identify fluid in rocks.

The coupling log correlates with lithology very well: The harder the formation is, the weaker the coupling. See for example the weak coupling at 248 between 2920-2924 feet and the corresponding low slowness value for the compressional wave at 250 on its slowness log 252.

The SR factor log 256 illustrates the effect of an alteration of the earth formation from the presence of fluids such as mud in the borehole. A deep invasion may be detected and can be a good permeability indicator because the stronger the invasion, the larger the permeability. An indication of fluid invasion can also be used to probe mechanical properties such as stress relief around the borehole.

Factorization of the Stoneley wave amplitude for the same interval at 222 in FIG. 13, exhibits different characteristics. The Stoneley wave is a surface wave that propagates along the borehole wall whereas head waves such as the compressional reach deep into the formation.

Thus at 260 in the Stoneley attenuation log 262 a slight attenuation occurs at the 2931 feet fracture. However, a strong Stoneley excitation on the Stoneley coupling log 264 (analogous to the coupling of the head waves) does not appear at 100. This is likely to be indicative that the fracture at 2930-2931 feet is probably sealed by mineralization, thus reducing the Stoneley wave excitation.

Stoneley wave excitation is related to how much source energy is converted into the Stoneley wave. Stoneley excitation is thus a function of many parameters such as shear rigidity, density, porosity, and permeability of the rock and the size of the borehole.

Shear rigidity has a strong effect on Stoneley excitation with stronger excitation accompanying a harder formation. The Stoneley excitation log correlates with the compressional velocity log very well at depth intervals 266 (2875-2882 feet), 268 (2921-2924 feet) and at 270 (2983-2987 feet).

The effects of density, porosity and permeability of rock may also be observed on the Stoneley excitation log 264. For example the slowness log shows two thin beds centered at 272 (2958 feet) and 274 (2962 feet) with bed 272 appearing to be harder. The Stoneley wave excitation, however, is much lower at 2958 feet than at 2962 feet.

Figure 14:
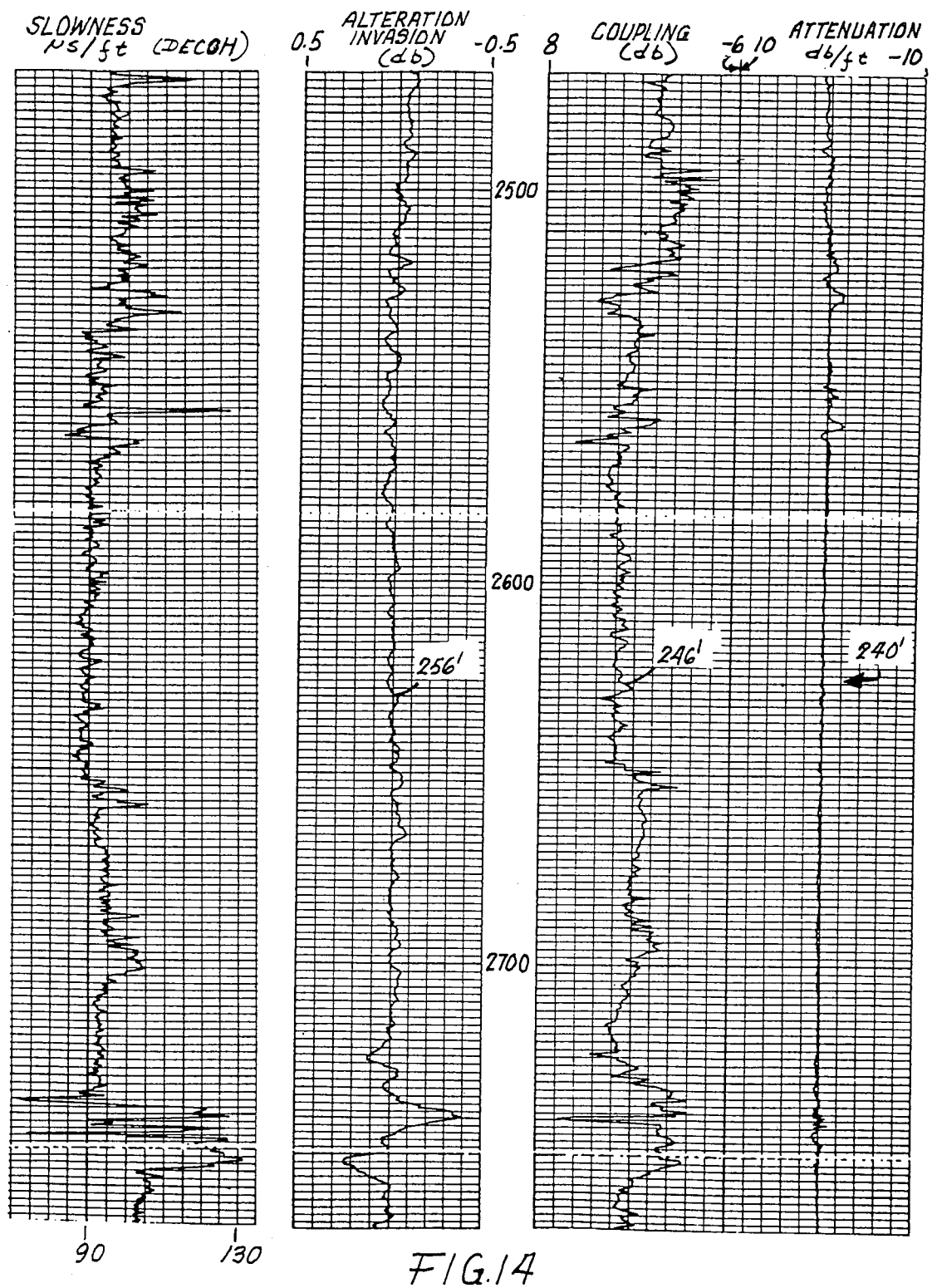
FIG. 14 is a display of various logs of different parameters obtained by factoring measurements in accordance with the invention.

FIG. 14 shows an enlarged display log 280 on which the compressional slowness log 72, also shown in FIG. 12, is placed alongside logs 240', 246' and 256' which respectively are indications of attenuation, coupling and alteration zone logs for the compressional wave for different depths. Each log reveals high resolution characteristics. Note that the amplitude factors in FIG. 14 and their corresponding parts in FIG. 13 do not have DC components but show local variations. The DC component in the amplitude factors has in effect been shifted into the first iterated gain factor values as illustrated at 230 in FIG. 13.

Figure 15:
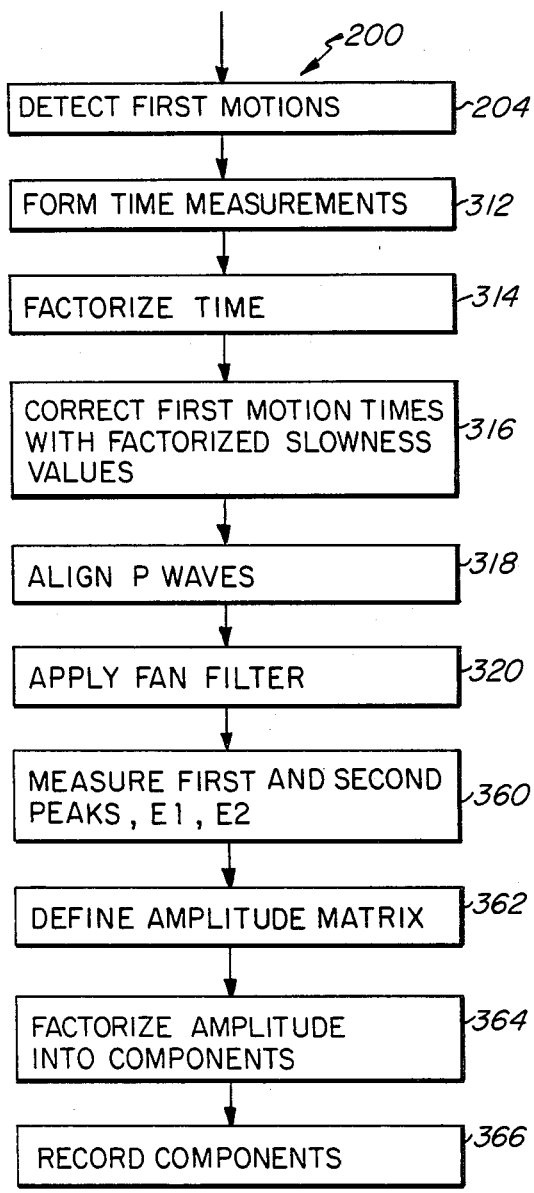
FIG. 15 is a flow chart for a technique in accordance with the invention to factorize components.
Figure 16:
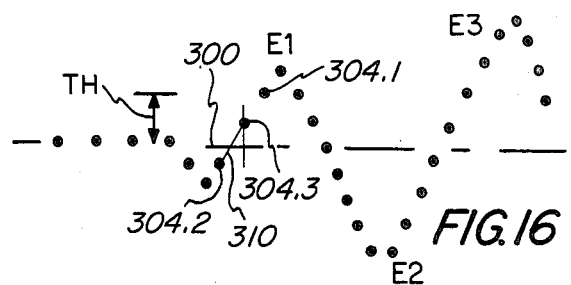
FIG. 16 is a representation of a portion of a digitized waveform to explain a first motion detection technique used in the method of FIG. 15.
Figure 17:
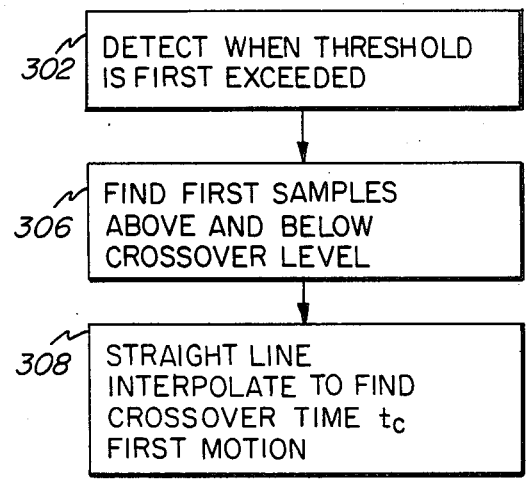
FIG. 17 is a flow chart for a first motion detection technique used in the method of FIG. 15.

The technique 200 of FIG. 13 is shown with further detail in FIGS. 15-18. The first motions detection of digital samples is done as illustrated in FIGS. 16 and 17. A threshold level, such as TH in FIG. 16, is set relative to a zero cross-over level 300 for each of the receivers 30.1-30.12 with gradually decreasing threshold levels for farther receivers. At 302 a detection is made when, for each waveform, and relative to the activation of the source that caused the waveform, the threshold is first exceeded. In FIG. 16, sample 304.1 is the first sample to do so.

At 306 the first samples are searched for those that occur immediately adjacent the cross-over level 300; namely, sample 304.2 on the negative side and 304.3 on the positive side. Once these latter samples have been found, the cross-over point 310 or first motion is determined at 308 by a straight line interpolation technique. Location of the cross-over point 310 relative to the time of actuation of source 28 provides at 312 an initial or provisional time measurement tc of the total travel time for the compressional arrival.

The time measurements are factorized at 314 into separate components, mud travel time Tm, and interval travel time, Ti, in the manner as previously described.

The threshold technique described with reference to FIGS. 16 and 17 does not prevent cycle skipping. Hence, the first motion times are corrected at 316 by summing the factorized values for mud and formation travel times for the depth associated with the waveforms.

The thus refined determinations of first motions in the waveforms in effect can be sufficient to proceed with further processing and the waveforms can be considered as effectively aligned as suggested at 318. Alternatively, the waveforms can be so stored in memory as to actually place the first motions in an orderly alignment in storage for convenience in further processing.

Figure 19:
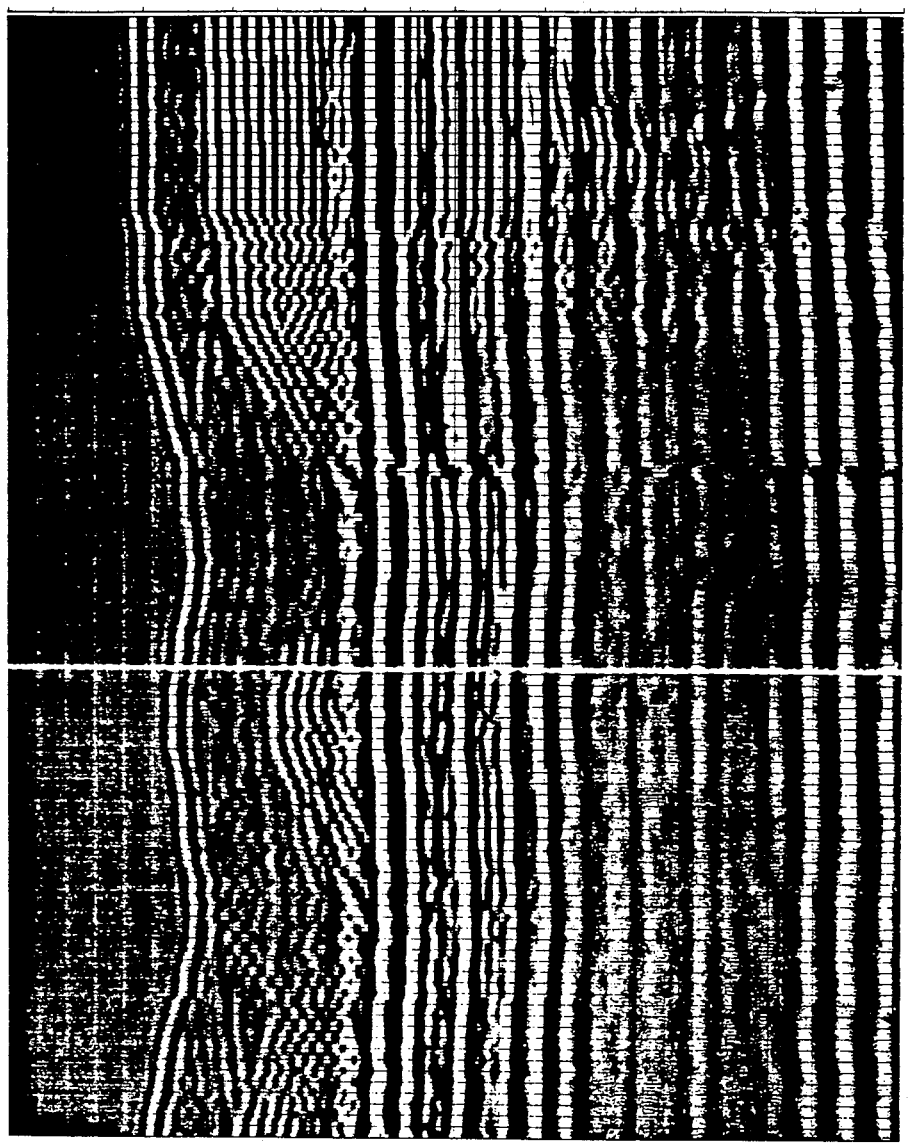
FIG. 19 through 24 are variable density displays of waveforms during different stages of the operation of the filter technique of FIG. 18.

At 320 a fan filter is applied to remove unwanted wave segments which can be seen in the VDL (variable density log) 322 of FIG. 19 for the raw waveforms. Note that other filters may be applied. Literature descriptions of fan filters using Hilbert transforms have been published: See, for example, articles entitled "Band-Limited Interpolation Operators and Applications in Seismic Processing" and "On some further Aspects of Fan Filtering" published as expanded abstracts by the Society of Exploration Geophysicists in response to the respective Dec. 1984 and Oct. 1985 Annual International Meetings.

Figure 18:
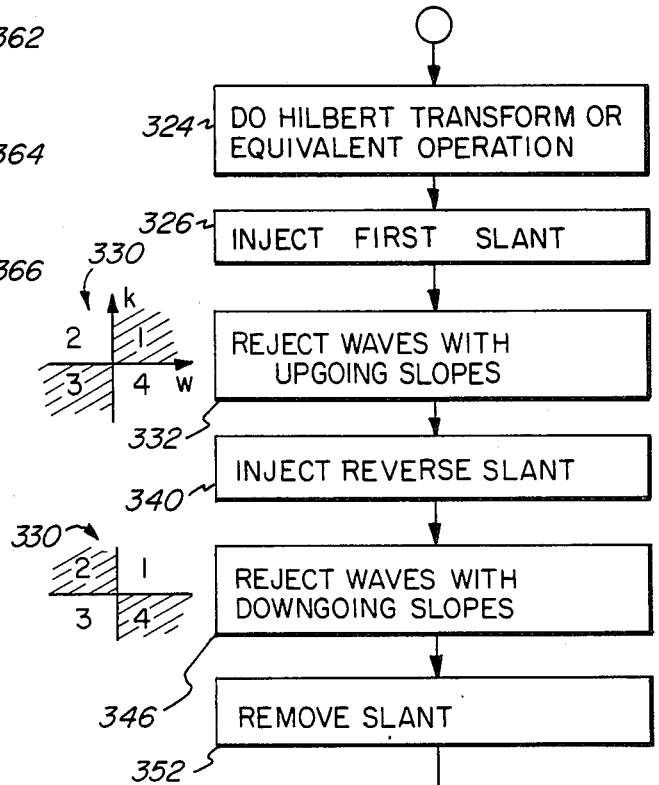
FIG. 18 is a flow chart of steps used to filter waveforms in the method of FIG. 15.
Figure 20:
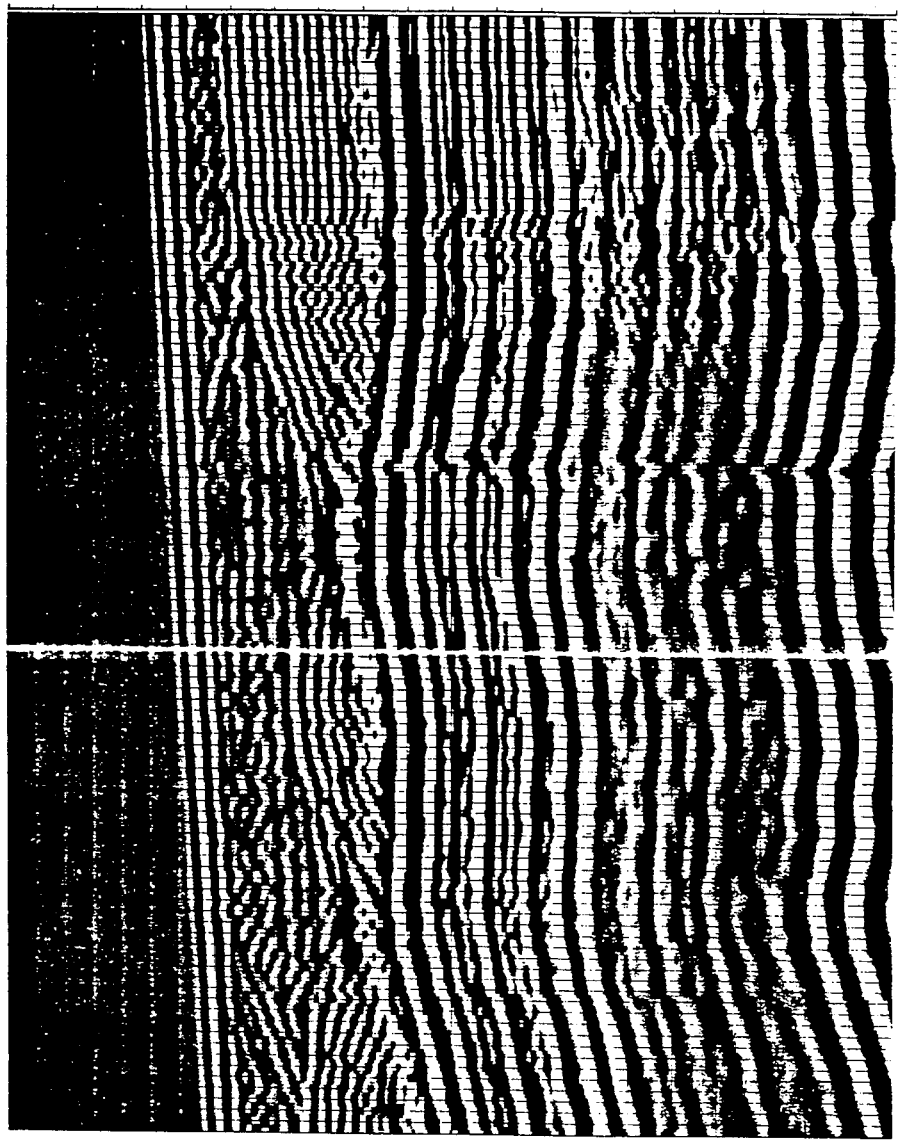

The filter process 320 commences, as shown in FIG. 18, by applying at 324 either a double Hilbert transform to transform the waveforms to the wave-number (k) - frequency (w) domain or an equivalent operator to the waveforms. At 326 a predetermined slant is applied to the transformed waveforms as shown with the VDL 328 in FIG. 20. The slant serves to preserve the compressional arrival when, at a later step waves with upgoing slopes are rejected. As a result of this Hilbert transformation or operation, the waveforms are so distributed that those segments having up-going slopes lie as illustrated at 330 in quadrants 1 and 3 and those with downgoing slopes lie in quadrants 2 and of the wavenumber/frequency domain.

Figure 21:
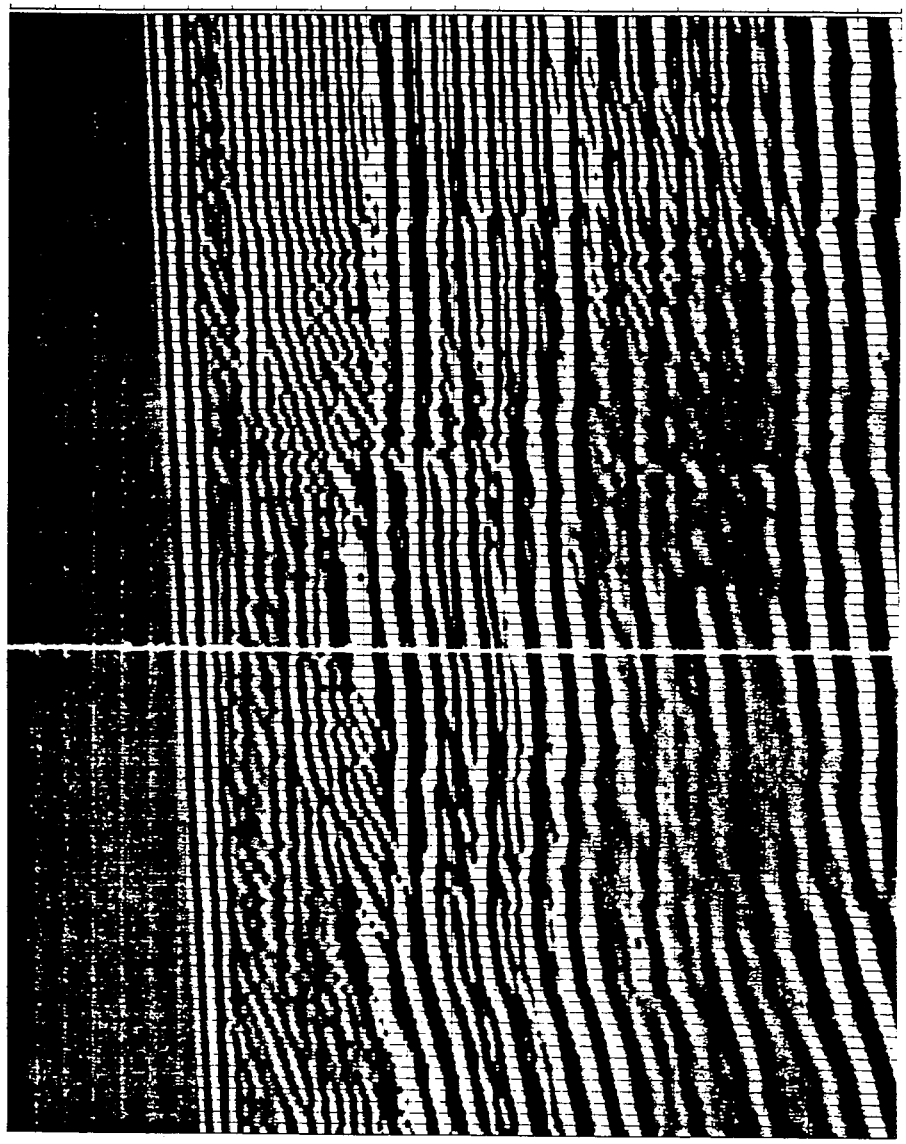

At 332 the waves with up-going slopes, i.e. those in quadrants 1 and 3, are rejected with a VDL plot of the remaining the waveforms appearing as shown at 334 in FIG. 21. Note that this VDL has wave patterns whose slopes are primarily down-going.

Figure 22:
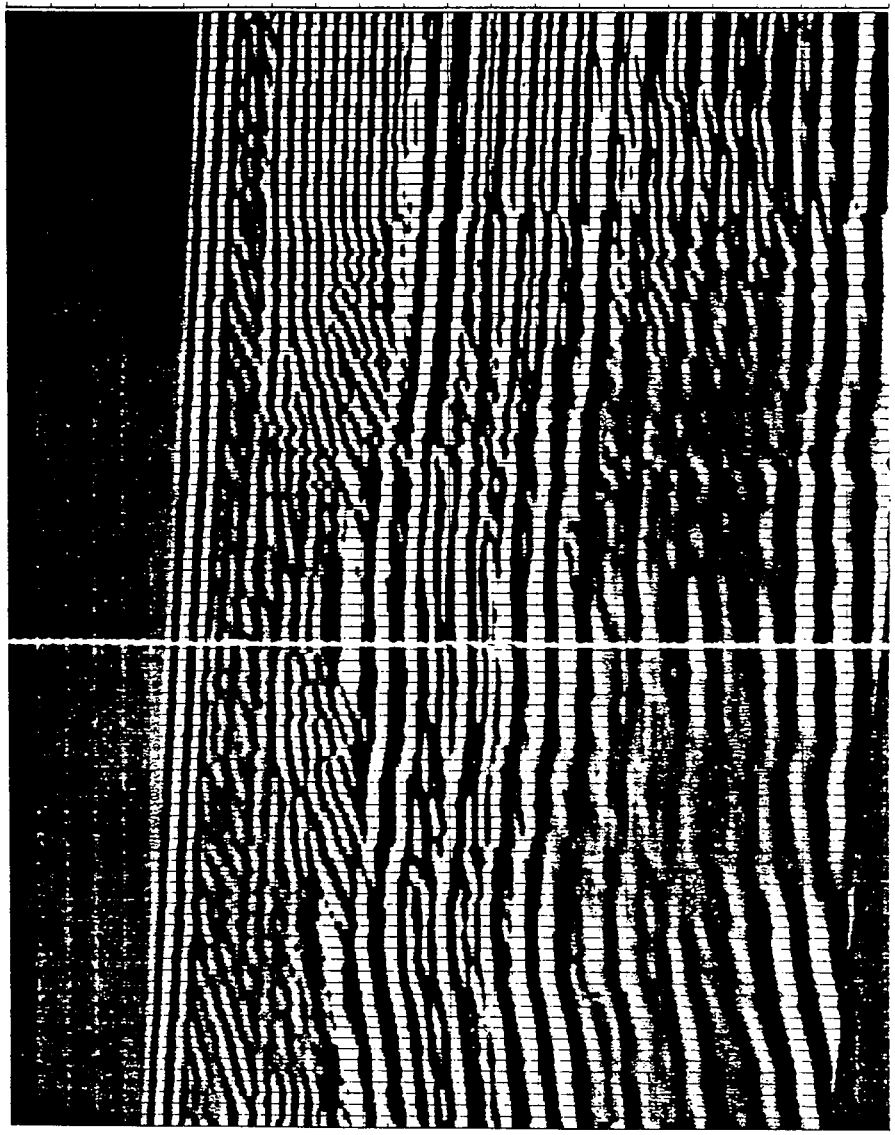
Figure 23:
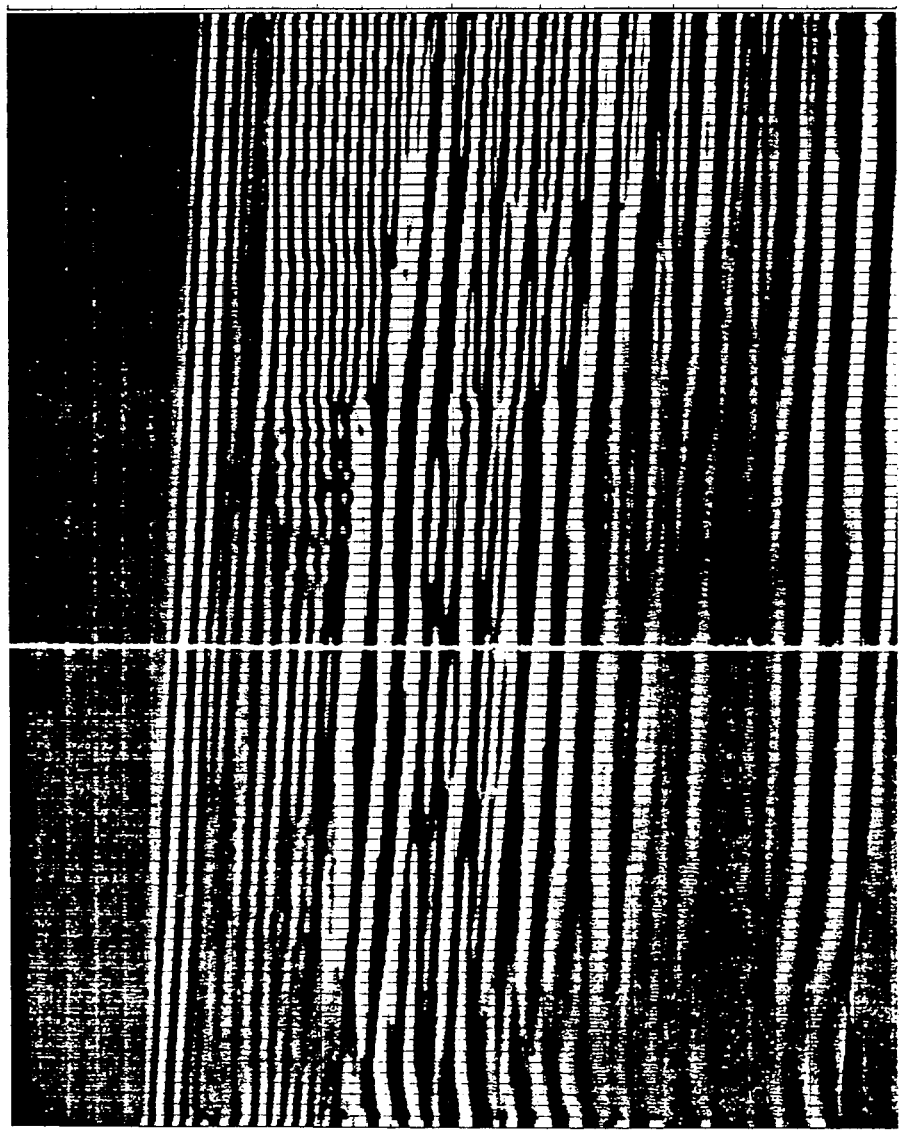
Figure 24:
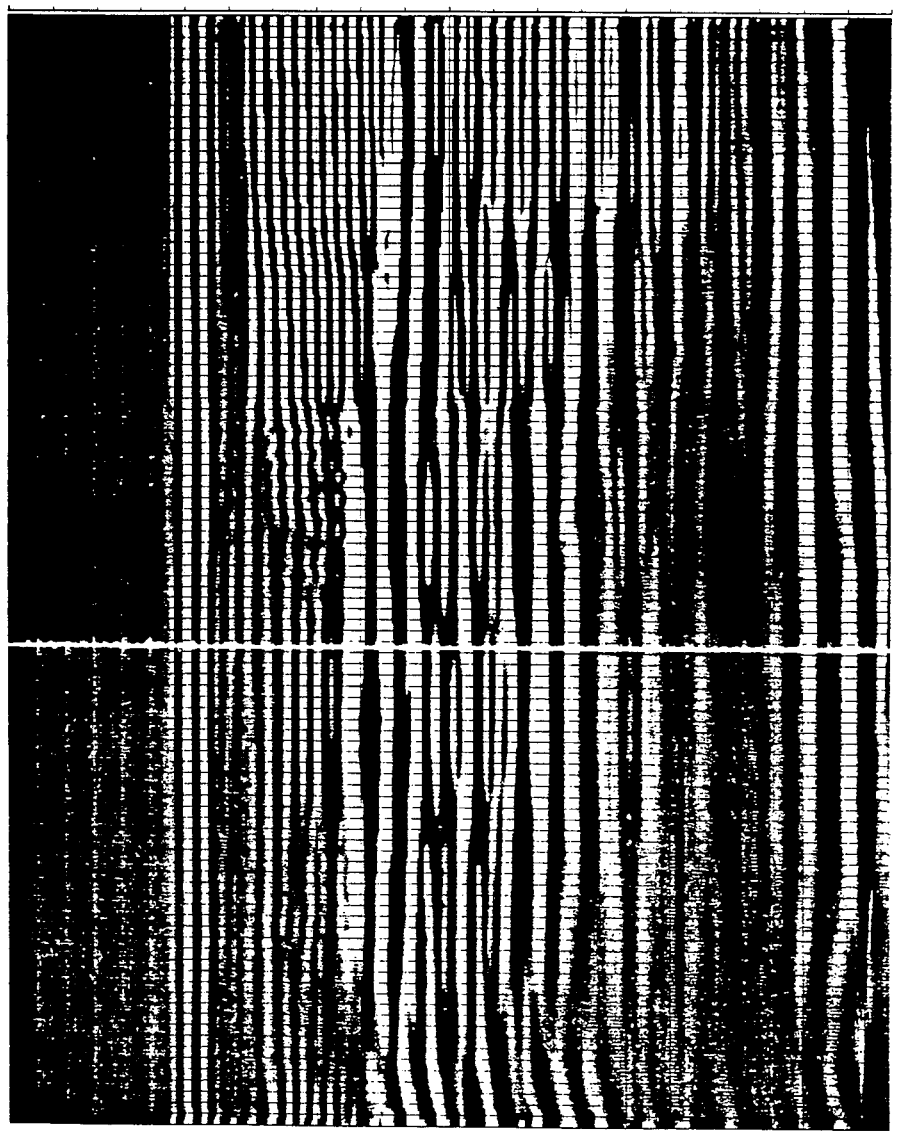

At 340 a reverse slant is applied as shown in VDL 342 in FIG. 22. The waves which lie in the second and fourth quadrant, i.e, those with down-going slopes are rejected at 346. The resulting waveforms appear as shown in the VDL 350 of FIG. 23. Note that the interfering waves have been substantially removed. At 352 the reverse slant is removed so that the remaining waveforms provide a VDL 354 as shown in FIG. 24 that appears free of interfering wave patterns.

The compressional arrival has at this point been substantially cleansed of interfering waves so that at step 360 in FIG. 15 the amplitude of the compressional can be determined.

The compressional amplitude may be represented by a measurement of maximum values of peaks E1, E2, or E3 or the area under the peaks or by such other characteristic representative of the magnitude of the compressional wave.

Figure 25:
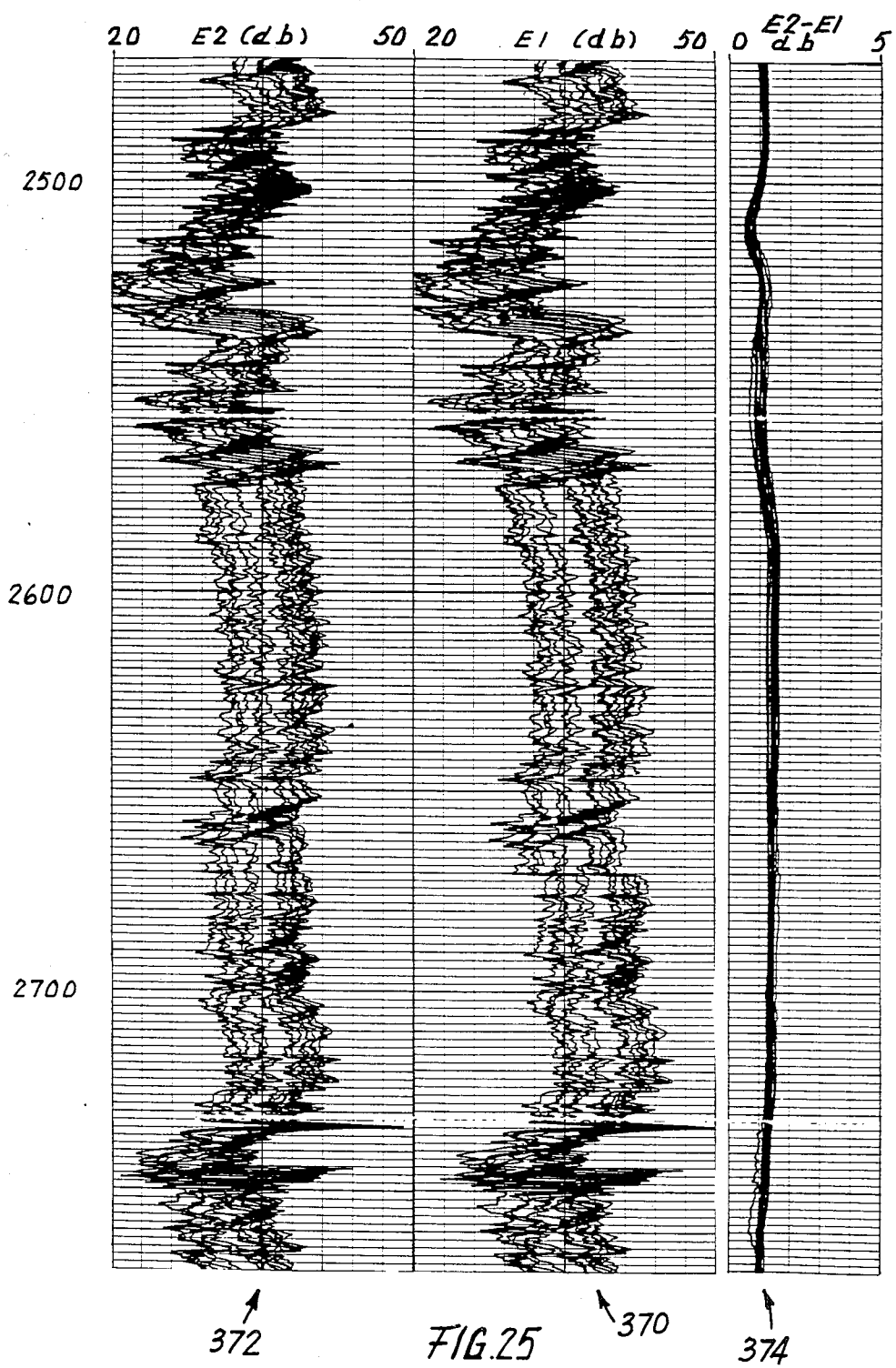
FIG. 25 is a display as a function of depth of various amplitudes determined in accordance with the techniques of FIGS. 13 and 15.

The effectiveness of the filtering step 320 can be appreciated with reference to FIG. 25 where the compressional amplitudes for peaks E1 and E2 from all twelve waveforms from receivers 30.1-30.12 are respectively plotted side by side in db at 370 and 372. The ratios of peaks E2 to E1 for each waveform are then recorded at 374 as the differences of their db values. The plot has a smooth narrow band that is demonstrative of the effectiveness of the noise and wave interference removals by the filtering process.

FIGS. 27-29 illustrate an example of the amplitude factorization technique described with reference to FIG. 13 but for a geometry of five successive tool shots at locations 82.1-82.5 with a four receiver tool. The model that describes the linear relationship between amplitude measurements m and unknown factors is: $A^*p=m$ for a depth range D of 10 locations separated by nine equal inter-receiver intervals d that are respectively identified as a1-a9. A is a matrix 400 of coefficients for a vector p that contains all the unknown factors that need to be estimated and $m_{ij}$ denotes the amplitude measurement at the jth receiver from the ith shot. As can be seen, most of the coefficients in the matrix are zero, as represented by the horizontal dashes or grid crossings.

The unknown factors in the example for the depth range D of 10 locations 82 include receiver gains (g1-g4,), source receiver couplings (RSC1-RSC10), attenuation of each depth interval (a1-a9) and formation alteration effect (SR1-SR9) for a total of thirty-two unknown factors for the depth range D. The source and receiver couplings are combined to appear as a single factor because the coupling factor is mainly controlled by the impedance contrast between the mud and the formation and should be equal at the same depth location. This, therefore, allows a reduction in the number of unknowns to manageable proportions relative to the number of measurements. The reduction was found to increase the statistical reliability of the solutions of the linear simultaneous equations.

The matrix 400 is applicable to the particular limited depth range investigation of FIG. 27 and defines twenty measurements m and thus as many linear equations as partly illustrated in FIG. 29.

The matrix coefficient values for formation alteration factor SR are derived from an assumed model of the invasion of the headwave into the earth formation as shown in FIG. 27. For the shortest source receiver spacing involving two depth intervals the depth of invasion is considered relatively shallow so that the contribution of the SR factor to the measurement m from the first receiver is low. This can be visualized from the relatively shallow path 402 in FIG. 27. The contribution increases as the source to receiver distance increases as shown for path 404 whereby the depth of the headwave correspondingly increases. Hence, the values of the coefficients for the SR factor are selected to reflect this as shown in the matrix 400. The matrix coefficient values for SR are determined from an evaluation of the position of a receiver 30 relative to the average of the source to receiver spacings on the tool. Thus where the first SR distance is 2 intervals and the others 3, 4, and 5, the average is 3.5 inter-receiver intervals d. In this case the SR coefficient for the first receiver 30.1 is less than the average by 1.5 and for the second by 0.5 so that these coefficients are negative. For the same reason the coefficients for receivers 30.3 and 30.4 are positive by 0.5 and by 1.5 respectively. Different dependencies can be employed.

This model of the SR factor was derived assuming that the simplest departure from the uniform model, that could be caused by a radial variation, would be proportional to linear variations of source-to-receiver offset. Other variations including higher orders are within the scope of the invention. Similar variations, both linear and higher order may be applicable to other components of the amplitude.

It will be seen that the coefficients for the factors SR are derived in a similar manner to the coefficients for the factors f in the modified matrix of FIG. 12C, since both relate to transmitter-receiver spacing, although the physical significances of the factors SR and f are different. The matrix A and vector p shown in FIG. 28 may in fact be modified to incorporate additional effects of transmitter-receiver spacing, for example by the addition of factors representing the effect of this spacing on the source receiver couplings RSC. Thus ten new factors would be added to the vector p, together with corresponding coefficients in the matrix A. These coefficients would have non-zero values distributed in the same manner as the non-zero values of the coefficients RSCi, and would be evaluated in the same manner as the coefficients for the factors SR and f.

The matrix 400 can be used to solve the linear equations set forth in FIG. 29 and is particularly effective for solving a sparse matrix part 405 for the coupling factor RSC. However, the matrix part 406 formed of coefficients for attenuation, a, and the matrix part 408 for the formation alteration SR factor are relatively dense, thus slowing down the convergence to values during the iterative Gauss-Seidel process. This becomes a greater problem when a larger array tool of twelve receivers is employed and data from a large depth range D is being processed. A sparser matrix for the attenuation coefficients is obtained by forming a difference matrix as partially shown at 410 in FIG. 30 and produced in a manner similar to that as shown in and described with reference to FIG. 4B.

A simplified, matrix is also needed for the matrix portion 408 in FIG. 28 for the formation alteration factor SR, that is a function of the source-receiver offset. Such simplified matrix can be made by producing a difference model whereby, for example, every fifth measurement has subtracted from it a first measurement. The SR matrix coefficient portion is shown at 414 in FIG. 31. Note the inclusion of measurements m from a sixth shot at 416.

Figure 32A:
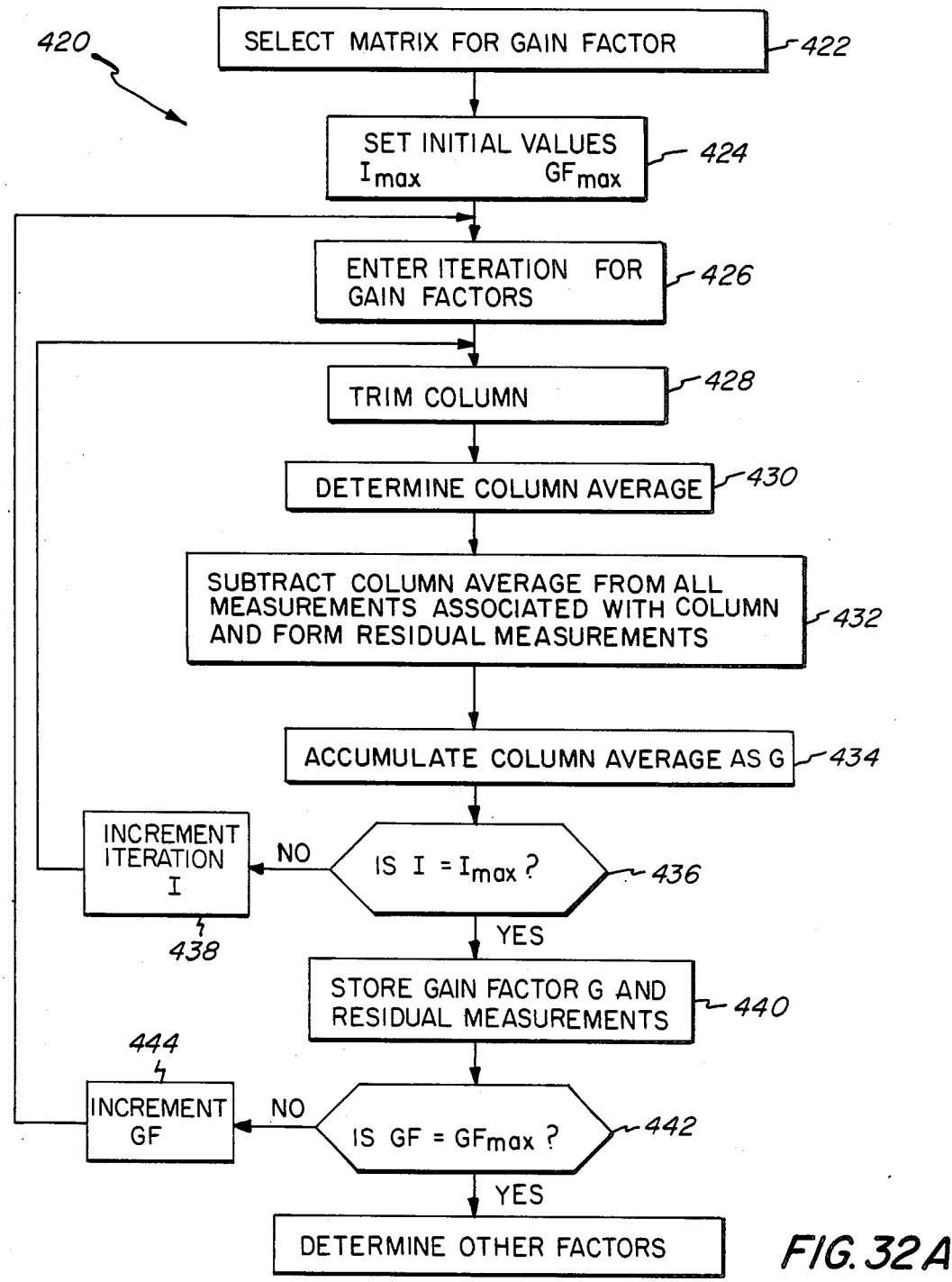
FIGS. 32A and 32B are flow charts for an iterative process in accordance with the invention to determine the amplitude components applicable to the matrix of FIG. 28.
Figure 32B:
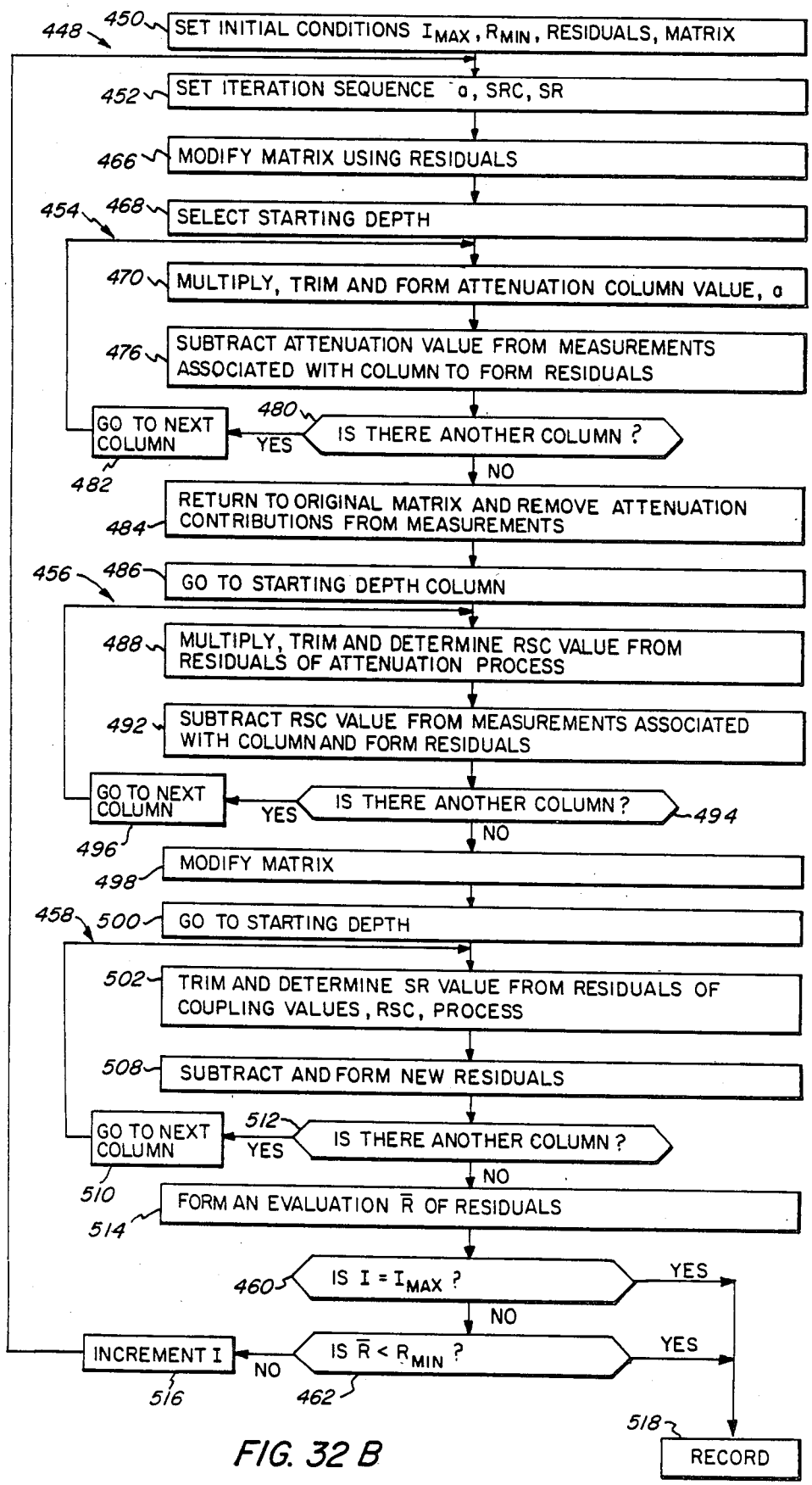

Solutions to the linear equations such as shown in FIG. 29 are obtained by using a Gauss-Seidel iteration technique as shown at 420 in FIGS. 32A and 32B. The order by which factors are determined by this iteration process is important. Hence, in the factorization of amplitude components the technique of Figures 32A and 32B follows the sequence gain, g (see FIG. 32A); attenuation, a; receiver and source couplings RSC, and formation alteration SR (see FIG. 32B).

At 422 in FIG. 32A, the matrix for determining the gain factors g is selected. This would have coefficients arranged as shown at 418 in FIG. 28.

At 424 in FIG. 32A certain initial conditions are set such as a maximum number of iterations, $I_{max}$ and the number of receivers 30 or gain factors, $GF_{max}$, that are to be determined. For the embodiment shown in FIG. 27, $GF_{max}$ is equal to four, but for that shown in FIG. 9, $GF_{max}$ would be equal to twelve.

The iteration process for a first gain factor is entered at 426 using the measurements m associated with this factor. At 428 a trimming step is entered whereby for example, extreme measurement values (the product of the coefficients and their associated measurements) in a column related to a particular receiver 30 are rejected. The trimming step 428 is similar to the one described with reference to steps 109, 110 in FIG. 10. For example, the measurements whose magnitudes fall in the top and lowest quartiles are rejected and the remainder used at 430 to determine a value representative of them, such as their average. For example, the first gain factor g, is determined by multiplying each of the matrix coefficients in the first column 418.1 (see FIG. 28) by the measurements m, trimming away upper and lower portions, summing the remainder, and then forming a representative value such as the average.

At 432 the representative value is subtracted from all of the measurements associated with the column, including those that were initially rejected. The remaining measurements form residual values that are used for the next iteration while the representative value is stored to be summed with subsequent ones at 434.

At 436 a test is made whether a maximum number of iterations have been made. If not, the process is repeated starting at the trimming step 428 after incrementing the iteration variable I at 438. Subsequent iterations are done using residual measurements associated with the column.

The number of iterations needed to emerge from the loop can be set high, but in practice is set at a value sufficient to obtain a convergence to a value for the gain factor. This may occur in as few as two or three iterations so that the value of $I_{max}$ is set accordingly. Upon completion of the particular gain factor iterations, the gain factor value and associated residual measurements values are stored at 440.

At 442 a test is made whether other gain factors, g, are to be determined. If so, the variable GF is incremented at 444 and the process repeated commensing at step 426. When all the gain factors g have been factorized, other amplitude related factors are determined at 446 using the technique 448 of FIG. 32B.

In FIG. 32B the residual values of the measurements remaining after the gain components have been factored out are factorized into attenuation, coupling and formation alteration components. This involves setting, at 450, initial conditions such as the maximum number of allowable iterations, $I_{max}$, a minimum value for the residuals, $R_{min}$, and various matrix forms such as described with reference to FIGS. 29, 30 and 31.

The order by which the amplitude components are factored out with the Gauss-Seidel iteration process has been found to signigicantly affect the final solution. The iteration sequence that has been found to be most desirable is gain, g; attenuation, a; source-receiver coupling, RSC and the formation alteration component, SR. This sequence is selected at 452.

This sequence is followed in technique 448 by using the residual measurements remaining from the gain factorization and then factorizing for attenuation at 454, coupling at 456 and formation alteration at 458. Net residuals are then determined and used in a subsequent iteration with the same sequence until, either a maximum number of iterations have occurred, as sensed by test 460, or the residuals, as tested at 462, are too small.

Techniques 454, 456 and 458 are each used to determine the values of a particular factor for all columns or common depths, and residual measurements are derived for use as the measurements for the factor that is next in the sequence, or the contributions from the previously determined factors removed from the measurements in the matrix being used. Different matrices are used to obtain a rapid convergence of the iteration process.

Figures 30, 31:
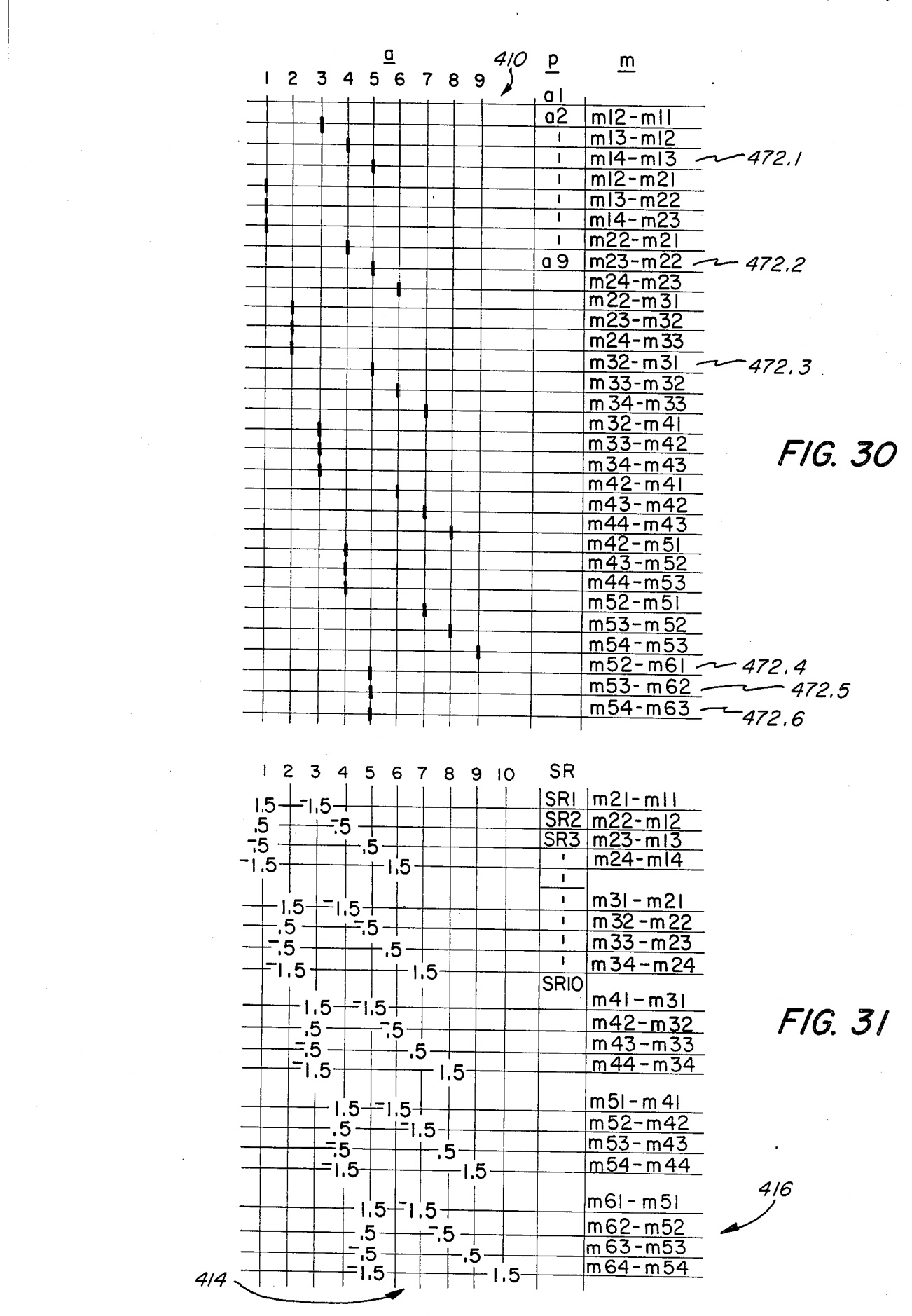

At 466 the attenuation matrix portion 406 such as shown in FIG. 28 is modified to produce a matrix such as 410 shown in FIG. 30 with the measurements being the residuals left from the gain factorization process of FIG. 32A.

At 468 a starting depth is selected for the iteration process 454. This is preferably in a depth-centered region, such as the middle column 5 in FIG. 30 within the depth range to which the factorization process applies. This depth-centered starting place has the advantage of reducing end-effects at the upper and lower ends of the range.

The process then starts at step 470 by multiplying all of the coefficients in the first selected column (#5) with the associated measurements m, i.e. those related to the same depth or column. This involves the measurements 472.1–6 as shown in FIG. 30 for six shots from source 28. Trimming of these measurements is done by for example excluding those measurements whose magnitudes are in upper and lower ranges such as the upper and lower quartiles. This trimming operation is similar to that described with reference to steps 109, 110 in FIG. 10.

The trimmed measurements are then summed and averaged as illustrated at 474 in FIG. 34 where the measurements 472.1 and 472.4 have been excluded. The averaged value a for the column or depth 5, is then stored at 470 in FIG. 32B as the value for the attenuation component at the specific depth for the first iteration and is to be summed with depth related component values derived during subsequent iterations.

At step 476 in FIG. 32B, the representative attenuation value a is subtracted from all of the measurements 472.1-6, see FIG. 30, associated with the column or depth to which this value relates. The remainders are stored as residuals for use in subsequent processing steps.

At 480 a test is made whether all columns or depths have been processed. If not, the process advances at 482 to the next set of coefficients in the next column and the measurements associated therewith and the process returns to step 470. The order in which the columns are processed can be as described with reference to step 122 in FIG. 10. Thus, the depth sequence would be 5, 6, 4, 7, 3, 8, 2, 9, 1 or in such other sequence where the determination of column averages branches out in both directions from a central depth region.

After all columns or depths have been processed, a return is made at 484 in FIG. 32B to the matrix 400 as shown in FIG. 28 and the contributions by the attenuation factors are subtracted from the residual measurements remaining from the gain factorizing technique of FIG. 32A.

Commencing with the starting depth as determined at 486 in FIG. 32B, the coefficients in the selected RSC column of the matrix part 405 are multiplied with the associated residual measurements R remaining from step 484. Upper and lower measurement values are trimmed, the remainder is summed and an average is formed at 488. The relationships shown at 490 in FIG. 35 are exemplary of how the first coupling factor value is determined for the starting depth, 5, using matrix 400 in FIG. 28 with the first and last measurements trimmed away.

The coupling value is then subtracted at 492 from the measurements associated with the column being processed and the residuals stored. At 494 a check is made whether other columns or depths are to be processed and, if so, this is done at 496 in a sequence as used and described with reference to step 482.

Once all columns have been so processed, the formation alteration components SR are determined with technique 458 by using a sparse matrix such as shown at 414 in FIG. 31. The sparse matrix 414 is formed at step 498 using as measurements the residuals from step 492. The process then proceeds at 500 to the factor SR5 related to the central depth region and the residual measurements associated therewith. Trimming, summing and averaging operations are carried out at 502. The first SR factor value is determined using the relationship as shown at 504 in FIG. 36 and with the first and last measurements excluded. This SR value is then subtracted at 508 from all measurements associated with the column to form residuals. The other columns are then processed using residual measurements from previous processing and in a column sequence as determined at 510 and described for step 482 in FIG. 32B.

Once all SR columns or depths have been processed, as determined at 512, a valuation R is made at 514 of the residuals remaining, for example, in the original matrix 400 in FIG. 28 after the contributions of all gain factors and the other amplitude factors are subtracted from the measurements. This valuation may, for example, be an average or such other value representative of the magnitude of all the residuals.

At 460 the test is made whether a maximum number of iterations have been made. If not test 462 is entered to determine whether the representative residual value R is smaller than a maximum level $R_{min.}$, If not, the iteration variable is incremented at 516 and a return is made to step 452.

New Values for the factors a, RSC and SR are then determined by using the residuals left after the contributions of all determined factor values from previous iterations have been subtracted from the original measurements.

Once either test 460 or 462 yields a positive result, the determination of factor components is deemed complete and their values can be recorded at 518 and a visual record can be made as in FIG. 13.

The number of iterations required to converge to a component value may vary. In some cases two or three iterations give a good result. However, in some cases more iterations are needed and generally the number is limited to about fifteen. A greater number of iterations is not likely to improve the quality of the solutions since noise is more likely to enter the iterative process. Generally a sufficient number of iterations are needed so as to reach residuals that are, as shown in FIG. 25 about 40 dB below the original measurement levels.

Figure 37:
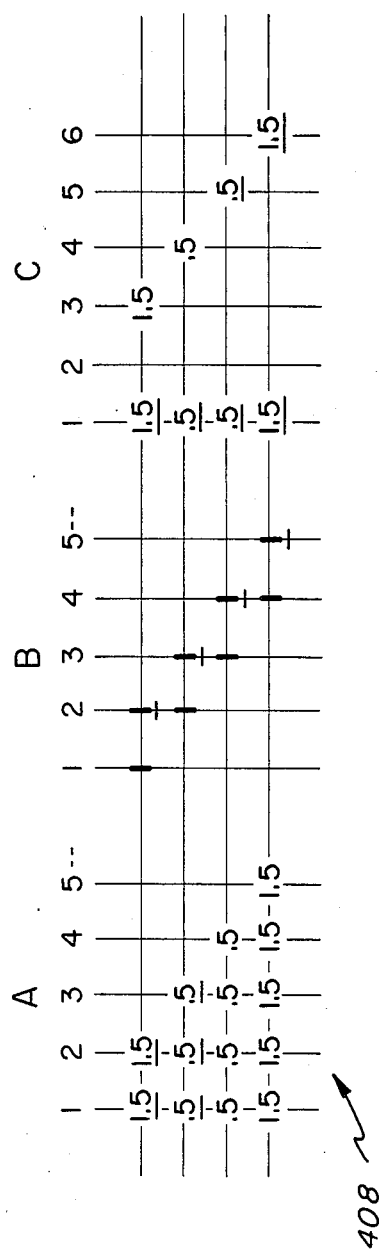
FIG. 37 is a partial diagrammatic view of a technique used to modify a matrix in accordance with the invention.

FIG. 37 is illustrative of an alternate technique for modifying the formation alteration coefficient matrix part 408 shown in FIG. 28 to achieve a sparse matrix. This involves multiplying matrix portion A, a part of matrix 408 by another matrix B formed of positive and negative coefficients that occur along diagonals. The multiplication involves standard matrix manipulation techniques as suggested by the relationship 530 in FIG. 37 to obtain a sparse matrix C. This matrix is sufficiently sparse to obtain values for the SR factor with an acceptable number of iterations.

Having thus described a technique to determine components of measurements made from inside a borehole penetrating an earth formation, its advantages can be appreciated. Variations can be implemented without departing from the scope of the invention as determined by the following claims:

I claim:

1. A method for deriving values for components of amplitude measurements derived from an investigation from inside a borehole penetrating an earth formation with a source of investigating energy that is directed from inside the borehole at different depths thereof towards the earth formation with a plurality of amplitude measurements relating to any one depth being attributable to a received magnitude of said energy from the use of said source of energy at different borehole depths comprising the steps of:

defining different components that make up said amplitude measurement;

defining coefficients respectively related to relative contributions by said components to respective amplitude measurements for the depths at which measurements are made over a desired depth range;

applying said coefficients to said measurements and iteratively deriving the values of the components at each said depth over the desired depth range; and recording said component values as a function of depth.

2. The method as claimed in claim 1 wherein said amplitude measurements are made from a predetermined segment of said investigating energy as detected at said different depths.

3. A method for deriving values of predetermined factors of sonic measurements made during an acoustic investigation from inside a borehole penetrating an earth formation with a tool having an acoustic pulse transmitter and a plurality of sonic receivers that are spaced from the transmitter and from each other along the tool to produce waveforms in response to detected acoustic energy generated by the transmitter at different borehole depths and at such rate that waveforms from different receivers relate to common depths, comprising the steps of:

generating amplitude measurements of selected portions of the waveforms;

generating coefficients for the relative contributions by different factors that make up respective amplitude measurements at different depths within said depth range;

combining said coefficients with said measurements in a preselected order of factors to derive values of said factors at said depths within the range; and recording said factor values as a function of depth.

4. The method as claimed in claim 3 wherein in said step of generating said coefficients comprises the step of generating coefficients representative of the gain of respective receivers, the acoustic coupling losses associated with the transmission of acoustic pulses into the earth formation and the transfer of acoustic energy from the earth formation to the receivers at said respective depths, and the attenuation of acoustic energy through the earth formation at said respective depths.

5. A method for determining a characteristic of an earth formation as a function of depth from amplitude measurements made with a tool over a depth range from inside a borehole penetrating the earth formation wherein a plurality of amplitude measurements relate to a common depth, comprising the steps of:

defining for each said amplitude measurement a plurality of components which when combined make up said amplitude measurement, with at least one of said components in each amplitude being representative of a earth formation characteristic at a depth to which said latter amplitude measurement relates;

defining coefficients for the values of said components for different depths throughout the depth range;

iteratively deriving values of said components with said coefficient in a predetermined sequence for said components; and forming a log as a function of depth of the values of the component representative of the earth formation characteristic.

6. The method as claimed in claim 15 wherein said measurements represent the travel times of an acoustic wave from a source to a receiver and wherein said components include mud travel times and earth formation interval travel times, and wherein said interval travel times are first in said sequence.

7. The method as claimed in claim 6 wherein said measurements represent the total travel time of a compressional wave arrival from a source to a receiver.

8. The method as claimed in claim 15 wherein said measurements are derived from acoustic receivers responsive to acoustic waves caused by an acoustic source, and wherein said measurements represent an amplitude of a said acoustic wave, with said components including the gain of said receivers, the coupling effectiveness of said acoustic wave at the boundary between the borehole and said earth formation and the attenuation of said acoustic wave by the earth formation and wherein the components are derived in the sequence of first gain then attenuation and finally coupling.

9. The method as claimed in claim 8 wherein said components further include a component whose value. varies as a function of source to receiver spacings. said latter component being iteratively derived after said coupling component.

10. The method as claimed in claim 8 wherein said measurements represent an amplitude of a compressional wave arrival.

11. The method as claimed in claim 5 wherein said measurements represent the travel time of a shear wave arrival from a source to a receiver.

12. The method as claimed in claim 5 wherein said measurements represent the travel time of a Stoneley wave arrival from a source to a receiver.

13. The method as claimed in claim 5 wherein said amplitude measurements represent measurements of an amplitude of the Stoneley wave.

14. The method as claimed in claim 6 wherein said measurements represent an amplitude of the shear wave.

15. The method as claimed in claim 5 and further comprising the steps of:

commencing said iteratively deriving step at a central region within the depth range and subsequently branching out there from both above and below said central region.

16. The method as claimed in claim 15 wherein said iteratively deriving step includes the steps of:

determining measurements related to a common depth;

trimming away extreme measurements related to the common depth;

combining the remaining measurements to form a value for a component for the depth to which the latter measurements relate;

subtracting the latter component value from the measurements associated with said latter depth; and repeating said latter determining, trimming combining and subtracting steps for depths within said range and in the sequence determined by said branching step.

17. The method as claimed in claim 16 wherein after values of said first component have been derived for different depths within the depth range, said latter determining, trimming, combining, and subtracting steps are done to derive values of a second component while using measurements from which contributions of the first components has been effectively removed.

18. A method for determining values of the slowness of an earth formation as a function of depth from time measurements made with a tool having an acoustic pulse transmitter and a plurality of sonic receivers that are spaced from the transmitter and from each other along the tool to produce waveforms in response to detected acoustic energy generated by the transmitter at different borehole depths and at such rate that waveforms from different receivers relate to common depths, comprising the steps of:

detecting first motions in the waveforms related to a desired depth range to produce time measurements representative of the total travel time of an acoustic wave from the transmitter to a sonic receiver:

defining for each said time measurement a plurality of factors that make up said time measurement and include the travel time of the acoustic wave, through the borehole at the transmitter through successive preselectively sized depth intervals of the earth formation located between the transmitter, and the sonic receiver, and through the borehole at the sonic receiver;

defining coefficients for representative of the relative contributions of the different factors that make up each said time measurement so as to define a first matrix of coefficients, one dimension of which is a function of said intervals extending along the depth range and another dimension of which is a function of said measurements as made along said depth range;

first determining values of the interval travel times through the earth formation by combining products of coefficients and measurements related to a common depth;

subtracting the values of the interval travel times from the measurements to form first residual measurements;

secondly determining values of the travel times through the borehole by combining products of coefficients and residual measurements related to a common depth;

subtracting the values of the borehole travel time from the first residual measurements to form second residual measurements:

repeating said determining and subtracting steps by using residual measurements remaining from a preceding determining step:

accumulating depth related values of the earth formation interval travel times as indicative of the slowness of the earth formation as a function of depth.

19. The method as set forth in claim 18 wherein the first defining step includes an offset travel time factor that is function of the transmitter to sonic receiver spacing; and further including after said step of determining the value of the travel time through the borehole and before said repeating the step the steps of:

lastly determining values of the offset factors by combining products of the coefficients and second residual measurements related to a common depth; and effectively subtracting the offset factor values from the second residual measurements to form third residual measurements.

20. The method as claimed in claim 18 wherein said determining steps are commenced with coefficients and measurements associated with a common depth that is at a start location in a central region of the depth range and branching out from there both below and above relative to said latter depth region.

21. The method as claimed in claim 20 wherein said branching step comprises combining products of coefficients and measurements that are generally alternately located above and below said start location.

22. The method as claimed in claim 20 wherein each of said combining steps is preceded by the step of:

trimming away extreme values of the products of coefficients and measurements related to a common depth.

23. The method as claimed in claim 22 wherein the trimming step excludes upper and lower quartile products of coefficients and measurements related to a common depth.

24. The method as claimed in claim 18 wherein said step of defining coefficients further includes the step of generating, from the first matrix, a second matrix that has a matrix portion of coefficients for the earth formation interval travel times that is substantially sparser than a corresponding coefficient matrix portion in the first matrix, and wherein said step of determining values of the interval travel times through the earth formation employs coefficients and measurements from said second matrix.

25. The method as claimed in claim 24 wherein the second matrix is generated by forming the difference between predetermined sets of measurements and related coefficients.

26. The method as claimed in claim 24 wherein said step of defining coefficients further includes the step of:

generating an alternate matrix that has a matrix portion of coefficients for the off-set factor that is substantially sparser than a corresponding coefficient matrix portion in the first matrix; and wherein said step of determining the off-set factors employs coefficients and measurements from the alternate matrix.

27. A method for deriving slowness values from sonic measurements derived from an acoustic investigation from inside a borehole penetrating an earth formation with a tool having an acoustic transmitter and a plurality of sonic receivers that are spaced from the transmitter and from each other along the tool to produce waveforms in response to detected acoustic energy generated by the transmitter at different depths and at such rate that waveforms from different receivers relate to common depths, comprising the steps of:

detecting first motions in the waveforms and deriving travel times of acoustic arrivals from the transmitter to the receivers which produced the waveforms;

factorizing the travel times into components of travel time through the borehole and travel time through the earth formation between the transmitter and the receivers;

effectively excluding from the factorizing step extreme values of the travel times derived from detected first motions; and deriving from said factorized travel times through the earth formation values of its slowness and recording said slowness values;

reconstructing the arrival times of first motions from said components;

determining amplitudes of the acoustic arrivals:

factorizing the amplitudes into components.

28. The method as claimed in claim 27 and further including the step of filtering the waveforms to remove interferences and mode conversions therefrom.

29. The method as claimed in claim 28 wherein the filtering step includes the step of applying a fan filter to the waveforms.

* * * * *